US012634741B2

(12) United States Patent
Taneja et al.

(10) Patent No.: US 12,634,741 B2
(45) Date of Patent: May 19, 2026

(54) METHOD FOR COEXISTENCE OF LOW LATENCY, LOW LOSS AND SCALABLE THROUGHPUT (L4S) AND NON-L4S TRAFFIC IN 5G-TYPE NETWORKS

(71) Applicant: Mavenir Systems, Inc., Richardson, TX (US)

(72) Inventors: Mukesh Taneja, Bangalore (IN); Moushumi Sen, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 18/731,498

(22) Filed: Jun. 3, 2024

(65) Prior Publication Data

US 2024/0414582 A1     Dec. 12, 2024

(30) Foreign Application Priority Data

Jun. 9, 2023   (IN) ............................. 202321039516

(51) Int. Cl.
 *H04W 28/02* (2009.01)
 *H04L 47/629* (2022.01)
(52) U.S. Cl.
 CPC ....... *H04W 28/0236* (2013.01); *H04L 47/629* (2013.01); *H04W 28/0268* (2013.01)
(58) Field of Classification Search
 CPC .......... H04W 28/0236; H04W 28/0268; H04L 47/629
 See application file for complete search history.

(56) References Cited

U.S. PATENT DOCUMENTS 10,334,594 B2 *  6/2019  Sundararajan .... H04W 72/0446
10,785,674 B2   9/2020  Cakulev et al.
                    (Continued)

FOREIGN PATENT DOCUMENTS

WO      2022005344 A1     1/2022
WO      2022153105 A1     7/2022

OTHER PUBLICATIONS

3rd Generation Partnership Project (3GPP) TS 36.300 v17.4 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)" Mar. 2023; 3rd Generation Partnership Project, Valbonne, France.
                    (Continued)

*Primary Examiner* — Todd L Barker
(74) *Attorney, Agent, or Firm* — Ruggiero McAllister & McMahon LLC

(57)               ABSTRACT

A method for optimizing coexistence of low latency, low loss and scalable throughput (L4S) traffic and non-L4S traffic in a 5G wireless system is provided, which method includes one of: a) performing one of i) a flow control between a centralized unit (CU) and a distributed unit (DU), or ii) radio resource management at the DU, to reduce latency experienced by the L4S traffic; or b) performing one of iii) a flow control between the CU and the DU to facilitate greater frequency of transmission of non-L4S traffic from CU-user plane (CU-UP) to the DU, or iv) radio resource management at the DU, to reduce a scheduling priority metric of a logical channel for the L4S traffic relative to a scheduling priority metric of a logical channel for the non-L4S traffic. To reduce latency of the L4S traffic, the L4S traffic scheduling priority is increased relative to the non-L4S traffic.

14 Claims, 19 Drawing Sheets

(56) References Cited

U.S. PATENT DOCUMENTS

| | | | |
|---|---|---|---|
| 2023/0142425 A1* | 5/2023 | Nádas | H04L 47/31 370/412 |
| 2024/0314636 A1* | 9/2024 | Liu | H04L 47/2416 |

OTHER PUBLICATIONS

3rd Generation Partnership Project (3GPP) TS 38.300 V 17.4.0 "Technical Specification Group Radio Access Network; NR; NR and NG-RAN Overall Description; Stage 2 (Release 17)" Mar. 2023; 3rd Generation Partnership Project, Valbonne, France.

3rd Generation Partnership Project (3GPP) TS 23.501 V 18.1.0 "Technical Specification Group Services and System Aspects; System Architecture for the 5G System (5GS); Stage 2 (Release 18)" Mar. 2023; 3rd Generation Partnership Project, Valbonne, France.

3rd Generation Partnership Project (3GPP ) TS 38.401 V 17.4.0 "Technical Specification Group Radio Access Network; NG-RAN; Architecture Description; (Release 17)" Mar. 2023; 3rd Generation Partnership Project, Valbonne, France.

3rd Generation Partnership Project (3GPP) TS 38.425 17.3. 0,"Technical Specification Group Radio Access Network; NG-RAN; NR user plane protocol; (Release 17)" Mar. 2023; 3rd Generation Partnership Project, Valbonne, France.

3rd Generation Partnership Project (3GPP) TS 38.323 V 17.4.0 Technical Specification Group Radio Access Network; NR; Packet Data Convergence Protocol (PDCP) specification (Release 17) Mar. 2023; 3rd Generation Partnership Project, Valbonne, France.

DeSchepper et al "RFC 9332: Dual-Queue Coupled Active Queue Management (AQM) for Low Latency, Low Loss, and Scalable Throughput (L4S)" Internet Engineering Task Force (IETF); Jan. 2023.

Briscoe et al "RFC 9330: Low Latency, Low Loss and Scalable Throughout (L4S) Internet Service: Architecture" Internet Engineering Task Force (IETF); Jan. 2023.

Deschepper et al "RFC 9331: The Explicit Congestion Notification (ECN) Protocol for Low Latency, Low Loss and Scalable Throughput (L4S)" Internet Engineering Task Force (IETF); Jan. 2023.

Alvestrand "RFC 8825 Overview: Real-Time Protocols for Browser-Based Applications" Internet Engineering Task Force (IETF); Jan. 2021.

Extended European search report for corresponding European patent application No. 24180406, 8 pages, dated Oct. 21, 2024.

Ericcson "L4S Support in 5 G" 3rd Generation Partnership Project (3GPP) draft, R2191-0724; 3GPP TSG-RAN; WG2-#107; Aug. 26-30, 2019.

\* cited by examiner

Figure 15:
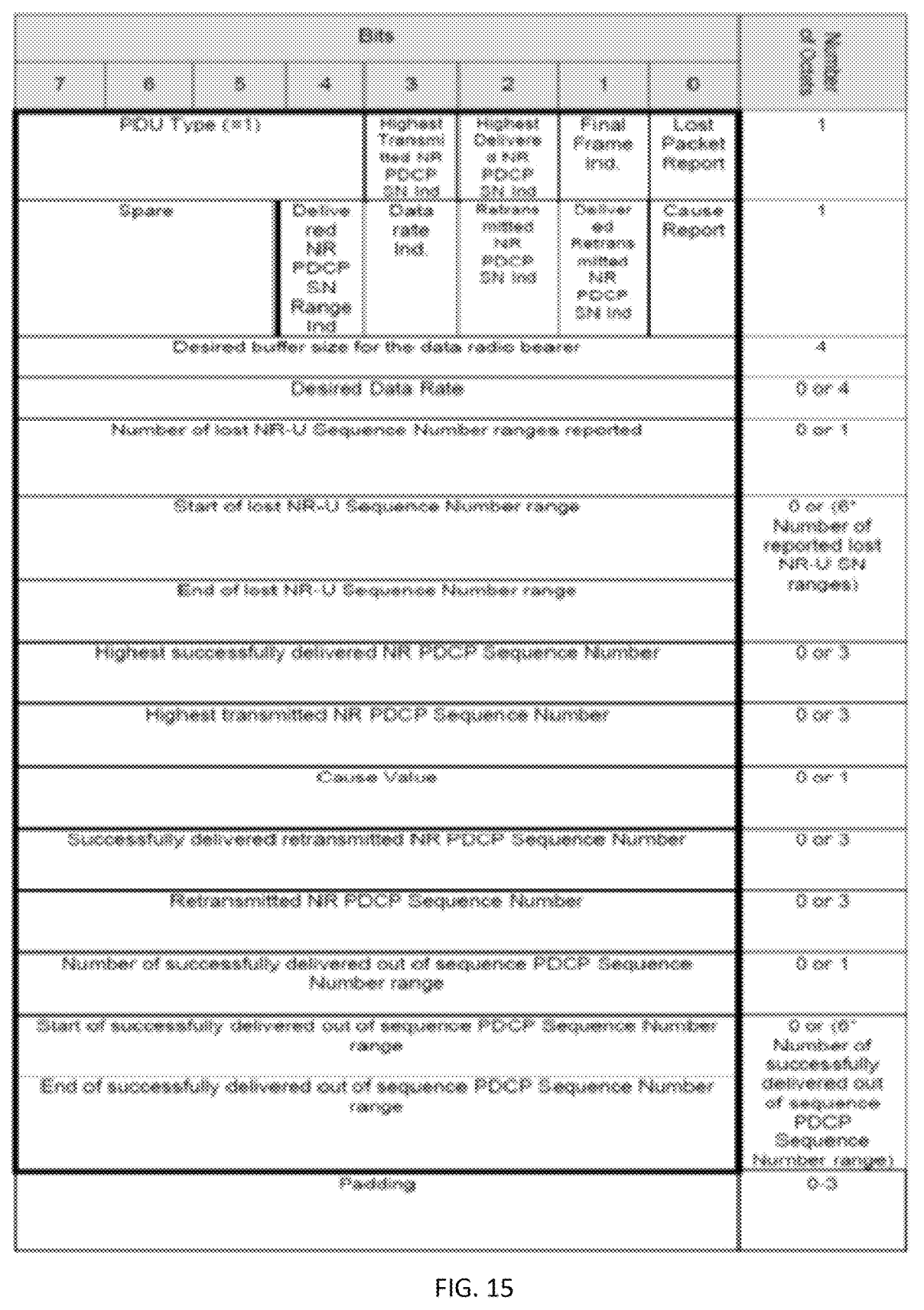

| | | | | | | | | Bits | Number of octets |
|---|---|---|---|---|---|---|---|---|---|
| 7 | 6 | 5 | 4 | 3 | 2 | 1 | 0 | | |
| PDU Type (=1) | | | | Highest Transmitted NR PDCP SN Ind. | Highest Delivered NR PDCP SN Ind. | Final Frame Ind. | Lost Packet Report | | 1 |
| Spare | | | Delivered NR PDCP SN Range Ind. | Data rate Ind. | Retransmitted NR PDCP SN Ind. | Delivered Retransmitted NR PDCP SN Ind. | Cause Report | | 1 |
| Desired buffer size for the data radio bearer | | | | | | | | | 4 |
| Desired Data Rate | | | | | | | | | 0 or 4 |
| Number of lost NR-U Sequence Number ranges reported | | | | | | | | | 0 or 1 |
| Start of lost NR-U Sequence Number range | | | | | | | | | 0 or (6 * Number of reported lost NR-U SN ranges) |
| End of lost NR-U Sequence Number range | | | | | | | | | |
| Highest successfully delivered NR PDCP Sequence Number | | | | | | | | | 0 or 3 |
| Highest transmitted NR PDCP Sequence Number | | | | | | | | | 0 or 3 |
| Cause Value | | | | | | | | | 0 or 1 |
| Successfully delivered retransmitted NR PDCP Sequence Number | | | | | | | | | 0 or 3 |
| Retransmitted NR PDCP Sequence Number | | | | | | | | | 0 or 3 |
| Number of successfully delivered out of sequence PDCP Sequence Number range | | | | | | | | | 0 or 1 |
| Start of successfully delivered out of sequence PDCP Sequence Number range | | | | | | | | | 0 or (6 * Number of successfully delivered out of sequence PDCP Sequence Number range) |
| End of successfully delivered out of sequence PDCP Sequence Number range | | | | | | | | | |
| Padding | | | | | | | | | 0-3 |

METHOD FOR COEXISTENCE OF LOW LATENCY, LOW LOSS AND SCALABLE THROUGHPUT (L4S) AND NON-L4S TRAFFIC IN 5G-TYPE NETWORKS

CROSS-REFERENCE TO RELATED APPLICATIONS

The present application claims priority to Indian Provisional Patent Application No. 202321039516 filed on Jun. 9, 2023, the entirety of which is incorporated by reference herein.

BACKGROUND OF THE INVENTION

1. Field of the Invention

The present disclosure is related to Low Latency, Low Loss and Scalable Throughput (L4S), and relates more particularly to optimizing radio resource management (RRM) methods for coexistence of L4S and non-L4S Traffic in 5G-type Networks.

2. Description of Related Art

L4S architecture enables Internet applications to achieve low queuing latency, low congestion loss and scalable throughput control. With L4S architecture, several Internet applications could transition away from capacity seeking congestion control algorithms that cause substantial delay and adopt a new class of congestion controls that seek capacity with very little queuing delay. A modified form of Explicit Congestion Notification (ECN) is used to assist with this mechanism. It also allows new class of L4S congestion controls to co-exist with classic congestion control in a shared network.

Radio resource management (RRM) methods in the 5G cellular systems are implemented as part of Medium Access Control (MAC) scheduler at the distributed unit (DU), where RRM methods are designed for non-L4S traffic. L4S traffic sources act in different way compared to the non-L4S traffic sources due to the scalable congestion control mechanisms which are integrated as part of L4S traffic sources.

The main concepts of L4S are provided below.

Explicit Congestion Notification (ECN): ECN uses two bits in the IP header for notification of congestion in the network. Four different codepoints supported by ECN for L4S are used.

1. Binary codepoint 00, Non-ECN Capable Transport (non-ECT). If a source marks a packet as Non-ECT, this packet does not support ECN and cannot be marked as Congestion Experienced (CE) if congestion occurs at a network node.
2. Binary codepoint 01, ECN Capable Transport (ECT) (1). This is used for L4S Capable Transport. In this case, a packet is sent in the L4S queue at a network node (and not in the classic queue). Also, the packet supports ECN and can be marked as Congestion Experienced (CE) by network nodes if congestion occurs.
3. Binary codepoint 10, ECT(0), ECN Capable Transport but not L4S Capable. In this case, the packet needs to be sent in the classic queue at a network node and not in the L4S queue.
4. Binary codepoint 11, Congestion Experienced (CE).

The L4S capable network node supports two queues-a Classic queue (for non-L4S packets) and an L4S queue (for L4S packets). Packets with non-ECT and ECT(0) codepoints are sent to the classic queue and other packets with codepoints ECT(1) and CE are sent to the L4S queue. In the L4S architecture, a network node marks packets as CE (Congestion Experienced) in the L4S queue as soon as a queuing delay in that node exceeds a threshold.

For the above, network nodes are required to distinguish L4S traffic from classic traffic for co-existence and incremental deployment. For ensuring low latency, L4S relies on Accurate ECN, which allows the sender to react more finely according to the congestion level, but which requires an adapted transport stack, such as Transmission Control Protocol (TCP) Prague.

Scalable Congestion Control protocol in end hosts: These methods adapt the rate of the sender node proportionally to the number of congestion signals received. During congestion, these methods decrease the rate of the sender node (in proportion to the number of CE-marked packets received at the receiver) and this decrease is less than what one finds with the Classic congestion control methods (such as with TCP Reno). TCP Prague (used with L4S), DCTCP (Data Center TCP) and Self-Clocked Rate Adaptation for Multimedia (SCREAM) are some examples of scalable congestion control methods.

The Web Real Time Communication (WebRTC) framework provides the building blocks from which web and app developers can seamlessly add video chat to a range of applications. The Real-Time Communications on the Web (RTCWEB) Working Group of Internet Engineering Task Force (IETF) standardized protocols for real-time communications between Web browsers, generally called "WebRTC" in RFC 8825. Some of the use cases for WebRTC technology are real-time audio and/or video calls, Web conferencing, and direct data transfer. Unlike most conventional Session Initiation Protocol (SIP)-based real-time systems, WebRTC (generally referenced by the reference numeral 1 in FIG. 1) communications are directly controlled by some Web server, via a JavaScript (JS) API, as shown in FIG. 1. WebRTC uses codecs such as H.264, iSAC, Opus and VP8. Products such as Google™ Hangouts™, Whatsapp™, Facebook™ Messenger™, ZOOM™ Team Communication, Skype™ for Web etc. are integrated with WebRTC. Scalable congestion control methods have been designed for WebRTC type of applications also. Self-Clocked Rate Adaptation for Multimedia (SCREAM) Congestion Control is one such method used by multimedia traffic sources which uses RTP/RTCP type of protocols for data and control.

Active Queue Management (AQM) in bottleneck links: AQM drops packets from a queue before reaching its memory limits and improves performance of end-to-end flows. It can also mark packets instead of dropping them if input traffic is ECN capable. To improve the coexistence of different traffic types, L4S architecture uses DualQ Coupled AQM, which enables the fair sharing of bandwidth of the low-latency (LL) traffic and other best effort (BE) traffics, via a coupling between the two queueing algorithms.

This overall end-to-end procedure works as follows (with the L4S architecture) in the IP networks: 1) The source (or sender) indicates L4S support through the ECN codepoint 01; 2) the Network nodes identify a packet as an L4S packet and change the ECN bits to Congestion Experienced (CE with codepoint 11) when congestion occurs; 3) The receiver checks the ECN bits on receipt of a packet and notifies the source about the congestion if it receives a Congestion Experienced (CE) codepoint in the ECN bits; and 4) The source (or sender) adapts the sending rate as per the Scalable Congestion Control described above.

In the following sections, overview of Next Generation Radio Access Network (NG-RAN) architecture and 5G New Radio (NR) stacks will be discussed. 5G NR (New Radio) user and control plane functions with monolithic gNB (gNodeB) are shown in FIGS. 2-4. For the user plane (shown in FIG. 2, which is in accordance with 3GPP TS 38.300), PHY (physical), MAC (Medium Access Control), RLC (Radio Link Control), PDCP (Packet Data Convergence Protocol) and SDAP (Service Data Adaptation Protocol) sublayers originate in the UE 101 and are terminated in the gNB 102 on the network side. In addition, as shown in FIG. 3 (which is accordance with 3GPP TS 23.501), which is a block diagram illustrating the user plane protocol stacks for a PDU session of 5G NR, the Protocol Data Unit (PDU) layer 31 corresponds to the PDU carried between the user equipment (UE) 101 and the data network (DN) over the PDU session. The PDU session can correspond to Internet Protocol version 4 (IPv4), IPv6, or both types of IP packets (IPv4v6). General Packet Radio Services (GPRS) Tunneling Protocol-User Plane (GTP-U) 32 supports tunnelling user plane data over N3 and N9 shown in FIG. 3, i.e., GTP-U 32 provides encapsulation of end user PDUs for N3 and N9 interfaces. Also shown in FIG. 3 are 5G Access Network (5G-AN) protocol layers 33, which depend on the type of AN. The radio protocol between the UE 101 and the 5G-AN node 34 (eNodeB or gNodeB) is specified in TS 36.300 and TS 38.300. L2 shown in FIG. 3 is also called the "Data Link Layer", and the L1 shown in FIG. 3 is the "Physical Layer". Also shown in FIG. 3 are: i) user plane function (UPF) 35; and ii) PDU session anchor 36. For the control plane (shown in FIG. 4, which is in accordance with 3GPP TS 38.300), RRC (Radio Resource Control), PDCP, RLC, MAC and PHY sublayers originate in the UE 101 and are terminated in the gNB 102 on the network side, and NAS (Non-Access Stratum) originate in the UE 101 and is terminated in the AMF (Access Mobility Function) 103 on the network side.

NG-Radio Access Network (NG-RAN) architecture from 3GPP TS 38.401 is shown in FIGS. 5-6. As shown in FIG. 5, the NG-RAN 301 consists of a set of gNBs 302 connected to the 5GC 303 through the NG interface. Each gNB comprises gNB-CU 304 and one or more gNB-DU 305 (see FIG. 5). As shown in FIG. 6 (which illustrates separation of CU-CP (CU-Control Plane) and CU-UP (CU-User Plane)), E1 is the interface between gNB-CU-CP (CU-Control Plane) 304a and gNB-CU-UP (CU-User Plane) 304b, F1-C is the interface between gNB-CU-CP 304a and gNB-DU 305, and F1-U is the interface between gNB-CU-UP 304b and gNB-DU 305. As shown in FIG. 6, gNB 302 can consist of a gNB-CU-CP 304a, multiple gNB-CU-UPs 304b and multiple gNB-DUs 305. One gNB-DU 305 is connected to only one gNB-CU-CP 304a, and one gNB-CU-UP 304b is connected to only one gNB-CU-CP 304a.

In this section, an overview of Layer 2 (L2) of 5G NR will be provided in connection with FIGS. 7-9. L2 of 5G NR is split into the following sublayers (in accordance with 3GPP TS 38.300):

1) Medium Access Control (MAC) 501 in FIGS. 7-9: The MAC sublayer offers Logical Channels (LCs) to the RLC sublayer. This layer runs a MAC scheduler to schedule radio resources across different LCs (and their associated radio bearers).

2) Radio Link Control (RLC) 502 in FIGS. 7-9: The RLC sublayer offers RLC channels to the Packet Data Convergence Protocol (PDCP) sublayer. The RLC sublayer supports three transmission modes: RLC-Transparent Mode (RLC-TM), RLC-Unacknowledged Mode (RLC-UM) and RLC-Acknowledgement Mode (RLC- AM). RLC configuration is per logical channel. It hosts ARQ (Automatic Repeat Request) protocol for RLC-AM mode.

3) Packet Data Convergence Protocol (PDCP) 503 in FIGS. 7-9: The PDCP sublayer offers Radio Bearers (RBs) to the SDAP sublayer. There are two types of Radio Bearers: Data Radio Bearers (DRBs) for data, and Signaling Radio Bearers (SRBs) for control plane.

4) Service Data Adaptation Protocol (SDAP) 504 in FIGS. 7-9: The SDAP offers QoS Flows to the 5GC (5G Core). This sublayer provides mapping between a QoS flow and a DRB. It is used for QoS Flow to DRB mapping.

FIG. 7 is a block diagram illustrating DL L2 structure (including a scheduler or priority handling module which handles multiple UEs in a cell), in accordance with 3GPP TS 38.300. FIG. 8 is a block diagram illustrating L2 structure for a single UE, in accordance with 3GPP TS 38.300. FIG. 9 is a block diagram illustrating L2 data flow example, in accordance with 3GPP TS 38.300 (in FIG. 9, H denotes headers or sub-headers).

Open Radio Access Network (O-RAN) is based on dis-aggregated components which are connected through open and standardized interfaces based on 3GPP NG-RAN. An overview of O-RAN with disaggregated RAN CU (Central-ized Unit), DU (Distributed Unit), and RU (Radio Unit), near-real-time Radio Intelligent Controller (Near-RT-RIC) and non-real-time RIC is illustrated in FIG. 10.

As shown in FIG. 10, the CU (shown split as O-CU-CP 801a and O-CU-UP 801b) and the DU (shown as O-DU 802) are connected using the F1 interface (with F1-C for control plane and F1-U for user plane traffic) over a mid-haul (MH) path. One DU can host multiple cells (e.g., one DU could host 24 cells) and each cell may support many users. For example, one cell may support 600 Radio Resource Control (RRC)-connected users and out of these 600, there may be 200 Active users (i.e., users that have data to send at a given point of time).

A cell site can comprise multiple sectors, and each sector can support multiple cells. For example, one site could comprise three sectors and each sector could support eight cells (with eight cells in each sector on different frequency bands). One CU-CP (CU-Control Plane) could support mul-tiple DUs and thus multiple cells. For example, a CU-CP could support 1,000 cells and around 100,000 User Equip-ments (UEs). Each UE could support multiple Data Radio Bearers (DRBs) and there could be multiple instances of CU-UP (CU-User Plane) to serve these DRBs. For example, each UE could support 4 DRBs, and 400,000 DRBs (cor-responding to 100,000 UEs) may be served by five CU-UP instances (and one CU-CP instance).

The DU could be located in a private data center, or it could be located at a cell-site. The CU could also be in a private data center or even hosted on a public cloud system. The DU and CU, which are typically located at different physical locations, could be tens of kilometers apart. The CU communicates with a 5G core system, which could also be hosted in the same public cloud system (or could be hosted by a different cloud provider). A RU (Radio Unit) (shown as O-RU 803 in FIG. 10) is located at a cell-site and commu-nicates with the DU via a front-haul (FH) interface.

The E2 nodes (CU and DU) are connected to the near-real-time RIC 132 using the E2 interface. The E2 interface is used to send data (e.g., user, cell, slice KPMs) from the RAN, and deploy control actions and policies to the RAN at near-real-time RIC 132. The application or service at the near-real-time RIC 132 that deploys the control actions and policies to the RAN are called xApps. The near-real-time RIC 132 is connected to the non-real-time RIC 133 (which is shown as part of Service Management and Orchestration (SMO) Framework 805 in FIG. 10) using the A1 interface. Also shown in FIG. 10 are O-eNB 806 (which is shown as being connected to the near-real-time RIC 132 and the SMO Framework 805) and O-Cloud 804 (which is shown as being connected to the SMO Framework 805).

In this section, PDU sessions, DRBs, and quality of service (QOS) flows will be discussed. In 5G networks, PDU connectivity service is a service that provides exchange of PDUs between a UE and a data network identified by a Data Network Name (DNN). The PDU Connectivity service is supported via PDU sessions that are established upon request from the UE. The DNN defines the interface to a specific external data network. One or more QoS flows can be supported in a PDU session. All the packets belonging to a specific QoS flow have the same 5QI (5G QOS Identifier). A PDU session consists of the following: Data Radio Bearer which is between UE and CU in RAN; and an NG-U GTP tunnel which is between CU-UP and UPF (User Plane Function) in the core network. FIG. 11 illustrates an example PDU session (in accordance with 3GPP TS 23.501) consisting of multiple DRBs, where each DRB can consist of multiple QoS flows. In FIG. 11, three components are shown for the PDU session 901: UE 101; access network (AN) 902; and UPF 903, which includes Packet Detection Rules (PDRs) 9031.

The following should be noted for 3GPP 5G network architecture, which is illustrated in FIG. 16 in the context of Radio Resource Management (RRM) (for connecting UE 101 to the network via RU 306) with a MAC Scheduler 1001:

1) The transport connection between the base station (i.e., CU-UP 304*b*) and the UPF 903 uses a single GTP-U tunnel per PDU session. The PDU session is identified using GTP-U TEID (Tunnel Endpoint Identifier).

2) The transport connection between the DU 305 and the CU-UP 304*b* uses a single GTP-U tunnel per DRB.

3) SDAP:
   a) The SDAP (Service Adaptation Protocol) 504 Layer receives downlink data from the UPF 903 across the NG-U interface.
   b) The SDAP 504 maps one or more QoS Flow(s) onto a specific DRB.
   c) The SDAP header is present between the UE 101 and the CU (when reflective QoS is enabled), and includes a field to identify the QoS flow within a specific PDU session.

4) GTP-User plane (GTP-U) protocol includes a field to identify the QoS flow and is present between CU-UP and UPF 903 (in the core network).

5) One (logical) RLC queue is implemented per DRB (or per logical channel), as shown in FIG. 16).

In this section, standardized 5QI to QoS characteristics mapping will be discussed. As per 3GPP TS 23.501, the one-to-one mapping of standardized 5QI values to 5G QoS characteristics is specified in Table 1a, Table 1b (which is a continuation of Table 1a) and the accompanying Notes shown below. The first column represents the 5QI value. The second column lists the different resource types, i.e., as one of Non-GBR, GBR, Delay-critical GBR. The third column ("Default Priority Level") represents the priority level Priority5QI, for which lower the value the higher the priority of the corresponding QoS flow. The fourth column represents the Packet Delay Budget (PDB), which defines an upper bound for the time that a packet may be delayed between the UE and the N6 termination point at the UPF. The fifth column represents the Packet Error Rate (PER). The sixth column represents the maximum data burst volume for delay-critical GBR types. The seventh column represents averaging window for GBR, delay critical GBR types.

TABLE 1a

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]), Electricity distribution - medium voltage, Process automation monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 | | 15 | 100 ms | $10^{-3}$ | N/A | 2000 ms | Mission Critical Video |

TABLE 1a-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| (NOTE 12) | | | (NOTE 10, NOTE 13) | | | | user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76]) |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR (NOTE 1) | 10 | 100 ms NOTE 10, NOTE 13 | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |

TABLE 1b

| 8 | | 80 | 300 ms (NOTE 13) | $10^{-6}$ | N/A | N/A | Video (Buffered Streaming) |
|---|---|---|---|---|---|---|---|
| 9 | | 90 | | | | | TCP-based (e.g., www, e-mail, chat, ftp, p2p file sharing, progressive video, etc.) |
| 69 (NOTE 9, NOTE 12) | | 5 | 60 ms (NOTE 7, NOTE 8) | $10^{-6}$ | NA | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5Q1 6/8/9) |
| 79 | | 65 | 50 ms (NOTE 10, NOTE 13) | $10^{-2}$ | N/A | N/A | V2X messages (see TS 23.287 [121]) |
| 80 | | 68 | 10 ms (NOTE 5, NOTE 10) | $10^{-6}$ | N/A | N/A | Low Latency eMBB applications Augmented Reality |
| 82 | Delay Critical | 19 | 10 ms (NOTE 4) | $10^{-4}$ | 255 bytes | 2000 ms | Discrete Automation (see TS 22.261 [2]) |
| 83 | GBR | 22 | 10 ms (NOTE 4) | $10^{-4}$ | 1354 bytes (NOTE 3) | 2000 ms | Discrete Automation (see TS 22.261 [2]), V2X messages (UE - RSU Platooning, Advanced Driving: Cooperative Lane Change with low LoA. |

TABLE 1b-continued

| | | | | | | |
|---|---|---|---|---|---|---|
| 84 | 24 | 30 ms (NOTE 6) | $10^{-5}$ | 1354 bytes (NOTE 3) | 2000 ms | See TS 22.186 [111], TS 23.287 [121]) Intelligent transport systems (see TS 22.261 [2]) |
| 85 | 21 | 5 ms (NOTE 5) | $10^{-5}$ | 255 bytes | 2000 ms | Electricity Distribution-high voltage (see TS 22.261 [2]) V2X messages (Remote Driving. See TS 22.186 [111], NOTE 16, see TS 23.287 [121]) |
| 86 | 18 | 5 ms (NOTE 5) | $10^{-4}$ | 1354 bytes | 2000 ms | V2X messages (Advanced Driving: Collision Avoidance, Platooning with high LoA. See TS 22.186 [111], TS 23.287 [121]) |

NOTE 1:
A packet which is delayed more than PDB is not counted as lost, thus not included in the PER.
NOTE 2:
It is required that default MDBV is supported by a PLMN supporting the related 5QIs.
NOTE 3:
The Maximum Transfer Unit (MTU) size considerations in clause 9.3 and Annex C of TS 23.060 [56] are also applicable. IP fragmentation may have impacts to CN PDB, and details are provided in clause 5.6.10.
NOTE 4:
A static value for the CN PDB of 1 ms for the delay between a UPF terminating N6 and a 5G-AN should be subtracted from a given PDB to derive the packet delay budget that applies to the radio interface. When a dynamic CN PDB is used. see clause 5.7.3.4.
NOTE 5:
A static value for the CN PDB of 2 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 6:
A static value for the CN PDB of 5 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 7:
For Mission Critical services, it may be assumed that the UPF terminating N6 is located "close" to the 5G_AN (roughly 10 ms) and is not normally used in a long distance, home routed roaming situation. Hence a static value for the CN PDB of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g. 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value
NOTE 13:
A static value for the CN PDB of 20 ms for the delay between a UPF terminating N6 and a 5G-AN should be subtracted from a given PDB to derive the packet delay budget that applies to the radio interface.
NOTE 14:
This 5QI is not supported in this Release of the specification as it is only used for transmission of V2X messages over MBMS bearers as defined in TS 23.285 [72] but the value is reserved for future use.
NOTE 15:
For "live" uplink streaming (see TS 26.238 [76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.
NOTE 16:
These services are expected to need much larger MDBV values to be signalled to the RAN. Support for such larger MDBV values with low latency and high reliability is likely to require a suitable RAN configuration, for which, the simulation scenarios in TR 38.824 [112] may contain some guidance.

Notes

For example, as shown in Table 1a, 5QI value 1 is of resource type GBR with the default priority value of 20, PDB of 100 ms, PER of 0.01, and averaging window of 2000 ms. Conversational voice falls under this category. Similarly, as shown in Table 1a, 5QI value 7 is of resource type Non-GBR with the default priority value of 70, PDB of 100 ms and PER of 0.001. Voice, video (live streaming), and interactive gaming fall under this category.

In this section, i) DL data from CU-UP to DU, and ii) flow control between CU-UP and DU will be discussed. F1-U interface, the procedures and functionality of which interface are defined in 3GPP TS 38.425, supports NR User Plane (NR UP) protocol, which provides support for flow control and reliability between CU-UP and DU for each DRB. Three types of PDU types are supported by NR-UP:

1) Downlink User Data (DUD) PDU from CU-UP to DU (as shown in FIG. 12): These are used to carry PDCP PDUs from CU-UP to DU for each DRB.

2) Downlink (DL) Data Delivery Status (DDDS) PDU from DU to CU-UP (as shown in FIG. 13 and FIG. 15).

a) The DDDS message conveys Desired Buffer Size (DBS), Desired Data Rate (DDR) and some other parameters from DU to CU-UP for each DRB as part of flow control feedback. If value of the DBS is zero for a DRB, the NR PDCP hosting node (e.g., the CU-UP in this example) shall stop sending data for that DRB from the CU-UP to the DU. If value of the DBS is greater than zero, the NR PDCP hosting node (e.g., CU-UP) may send up to this amount of data for that DRB. The value of DDR is the amount of data desired to be received every second by the DU (from CU-UP) for that DRB.

b) The corresponding node (e.g., DU in this example) can also transfer uplink data from the DU to the CU-UP for the concerned DRB along with the DDDS frame in the same GTP-U tunnel.

3) Transfer of (Radio) Assistance Information (TAI) PDU from DU to CU-UP (as shown in FIG. 14).

To recap, FIG. 12 illustrates DL user data (i.e., PDCP PDUs) from the node hosting NR PDCP 1401 (CU-UP in this example) to RLC SDU queues at the corresponding node 1402 (DU in this example). FIG. 13 illustrates DL Data Delivery Status (DDDS) PDU (flow control feedback) being sent from the corresponding node 1402 (DU in this example) to the node hosting NR PDCP 1401 (CU-UP in this example) for each DRB. FIG. 14 illustrates transfer of (Radio) Assistance Information from the corresponding node 1402 (DU in this example) to the node hosting NR PDCP 1401 (CU-UP in this example). FIG. 15 illustrates the details of DL Data Delivery Status (DDDS) sent from the corresponding node 1402 (DU in this example) to the node hosting NR PDCP 1401 (CU-UP in this example) for each DRB.

In this section, triggers and frequency of sending DDDS from DU to CU-UP will be discussed. For RLC Acknowledged Mode (AM), one can define more than one trigger to send DDDS message. Reception of status PDU from the peer RLC entity could be one trigger because it triggers removal of those RLC PDUs from the queue which are known to have been received at the UE. However, reception of status PDU may be delayed sometimes owing to bad UL radio channel conditions, in which case DU may send DDDS message at regular intervals of time. Thus, DU may trigger DDDS message transmission when periodic timer expires or status PDU is received (from UE), whichever happens first. For RLC Unacknowledge Mode (UM), owing to non-provision of reliability, RLC status PDU mechanism does not apply, and hence only periodic timer expiry becomes the trigger for sending DDDS from DU to CU-UP. In a static configuration, periodic timer value will be held constant.

In this section, Radio Resource Management (RRM) will be discussed. FIG. 16 is a block diagram illustrating RRM with a MAC Scheduler. L2 methods (such as MAC scheduler) play a critical role in allocating radio resources to different UEs in a cellular network. The scheduling priority of a logical channel ($P_{LC}$) is determined as part of MAC scheduler using one of the following:

$$P_{LC} = W_{5QI} * P_{5QI} + W_{GBR} * P_{GBR} + W_{PDB} * P_{PDB} + W_{PF} * P_{PF}, \text{ or}$$

$$P_{LC} = (W_{5QI} * P_{5QI} + W_{PF} * P_{PF}) * \text{maximum } (W_{GBR} * P_{GBR}, W_{PDB} * P_{PDB})$$

Once one of the above methods is used to compute scheduling priority of a logical channel corresponding to a UE in a cell, the same method is used for all other UEs.

In the above expressions, the parameters are defined as follows:

a) $P_{5QI}$ is the priority metric corresponding to the QoS class (5QI) of the logical channel. Incoming traffic from a DRB is mapped to Logical Channel (LC) at RLC level. $P_{5QI}$ is the default 5QI priority value, $\text{Priority}_{5QI}$, of a QoS flow that is mapped to the current LC. The lower the value of $\text{Priority}_{5QI}$ the higher the priority of the corresponding QoS flow. For example, Voice over New Radio (VoNR) (with 5QI of 1) will have a much higher $P_{5QI}$ compared to web browsing (with 5QI of 9).

b) $P_{GBR}$ is the priority metric corresponding to the target bit rate of the corresponding logical channel. The GBR metric $P_{GBR}$ represents the fraction of data that must be delivered to the UE within the time left in the current averaging window $T_{avg\_win}$ (as per 5QI table, default is 2000 msec.) to meet the UE's GBR requirement. $P_{GBR}$ is calculated as follows:

$$P_{GBR} = remData/targetData$$

where targetData is the total data bits to be served in each averaging window $T_{avg\_win}$ in order to meet the GFBR of the given QoS flow;

remData is the amount of data bits remaining to be served within the time left in the current averaging window;

$\text{Priority}_{GBR}$ is reset to 1 at the start of each averaging window $T_{avg\_win}$, and should go down to 0 towards the end of this window if the GBR criterion is met; and $\text{Priority}_{GBR}=0$ for non-GBR flows.

c) $P_{PDB}$ is the priority metric corresponding to the packet delay budget at DU for the corresponding logical channel. $P_{PDB}=1$ if $PDB^{DU}<=\text{QDelay}_{RLC}$ and $P_{PDB}=1/(PDB^{DU}-\text{QDelay}_{RLC})$ if $PDB^{DU}>\text{QDelay}_{RLC}$ where both $PDB^{DU}$ (Packet Delay Budget at DU) and RLC Queuing delay, $\text{QDelay}_{RLC}$, are measured in terms of slots. $\text{QDelay}_{RLC}=(t-T_{RLC})$ is the delay of the oldest RLC packet in the QoS flow that has not been scheduled yet, and it is calculated as the difference in time between the SDU insertion in RLC queue to current time where t:=current time instant, $T_{RLC}$:=time instant when oldest SDU was inserted in RLC.

d) $P_{PF}$ is the priority metric corresponding to proportional fair metric of the UE. $P_{PF}$ is the classical PF Metric, calculated on a per UE basis as $P_{PF}=r/R_{avg}$ where r: UE spectral efficiency calculated based on one RB and its last reported CQI; and $R_{avg}=a \cdot R_{avg}+(1-a) \cdot b$, UE's average throughput, where $b>=0$ is #bits scheduled in current TTI and $0<a<=1$ is the IIR filter coefficient e) In addition, the following weights are defined: $W_{5QI}$ is the weight of $P_{5QI}$; f) $W_{GBR}$ is the weight of $P_{GBR}$; g) $W_{PDB}$ is the weight of $P_{PDB}$; and h) $W_{PF}$ is the weight of $P_{PF}$. Each of the above weights is set to a value between 0 and 1.

L4S relies on ECN bits in the IP header and the ability of network nodes to mark these bits as needed by the L4S architecture to manage congestion in the network. There are three types of bottleneck queues in O-RAN architecture, which are described below.

1. Internet Protocol (IP) queues. IP queues at the intermediate routers between the 5G core network and the CU-UP, or between the 5G CU-UP and the 5G DU.
2. Packet Data Convergence Protocol (PDCP) queues. As previously discussed, CU-UP and DU could be located in different data centers and could be physically located apart from each other (e.g., DU in a private data center or at cell site and the CU-UP 100 km away in a public cloud) in the O-RAN's disaggregated architecture. PDCP queue for a DRB at CU-UP stores PDCP SDUs (i.e., incoming IP packets from the 5G core network). Once it has transmitted PDCP PDUs to DU, it also stores these PDUs in a retransmission queue until these are acknowledged by the DU. PDCP queue can build up if buffer occupancy is consistently quite high in the corresponding RLC queue in the DU. PDCP queue can also build up if the packet error rate is quite high over the mid-haul that is being used to connect DU and CU. The L4S architecture doesn't have visibility into it.
3. Radio Link Control (RLC) queues. RLC queues at the DU (for RLC SDUs/PDUs). The DL (downlink) RLC queue for a DRB at the DU stores RLC SDUs (or PDCP PDUs) that it receives from CU-UP in the downlink direction. The UE corresponding to this DRB (or the corresponding logical channel) could be experiencing poor channel conditions or high interference or cell-load could be quite high in the cell where the UE is located, and such conditions can result in queue build up for the corresponding DRB. The L4S architecture doesn't have visibility into it.

Current L4S architecture and associated mechanisms take care of congestion management taking into account the first type of queues (i.e., the IP queues at the intermediate routers). It doesn't really have visibility into the PDCP queues at the CU-UP and the RLC queues at the DU and the dynamic behavior of these queues in the O-RAN architecture as discussed above.

In this section, issues raised by coexistence of L4S and non-L4S traffic in 5G-type of cellular networks will be discussed. As described above, radio resource management methods in 5G cellular systems are implemented as part of the MAC scheduler at the DU, e.g., as shown in FIG. 16, which resource allocation methods were designed for non-L4S traffic. L4S traffic sources act in a different way compared to the non-L4S traffic sources due to the scalable congestion control mechanisms which are integrated as part of L4S traffic sources. Intermediate routers and other nodes also treat L4S traffic in a different way compared to non-L4S traffic, as previously described above. DualQ active queue management should be used at the intermediate switches or routers for co-existence of low latency and best effort traffic, so that a fair share of the bandwidth is given to each of these different traffic sources. In addition, CU-DU flow control, which was previously described above, is currently used for non-L4S traffic.

Accordingly, there is a need for a system and method to achieve an enhanced radio resource management and CU-DU flow control for optimizing policy based co-existence of L4S and non-L4S traffic in 5G cellular networks.

SUMMARY

Accordingly, what is desired is a system and method to achieve an enhanced radio resource management for optimizing policy based co-existence of L4S and non-L4S traffic in 5G cellular networks.

It is further desired to provide a system and method that effectively achieves CU-DU flow control for scenarios where traffic over CU-DU mid-haul is from a mix of L4S and non-L4S traffic sources, thereby helping to support various co-existence policies for L4S and non-L4S traffic over CU-DU mid-haul in 5G networks (e.g., O-RAN).

According to an example method, coexistence of low latency, low loss and scalable throughput (L4S) traffic and non-L4S traffic in a 5G wireless system is optimized by performing a flow control between a centralized unit (CU) and a distributed unit (DU to reduce latency experienced by the L4S traffic.

According to an example method, coexistence of low latency, low loss and scalable throughput (L4S) traffic and non-L4S traffic in a 5G wireless system is optimized by performing radio resource management at the DU to reduce latency experienced by the L4S traffic.

According to an example method, to reduce latency experienced by the L4S traffic, the radio resource management at the DU is performed to increase the scheduling priority metric of the logical channel for the L4S traffic relative to the scheduling priority metric of the logical channel for the non-L4S traffic.

According to an example method, coexistence of low latency, low loss and scalable throughput (L4S) traffic and non-L4S traffic in a 5G wireless system is optimized by performing a flow control between the CU and the DU to facilitate greater frequency of transmission of non-L4S traffic from CU-user plane (CU-UP) to the DU.

According to an example method, coexistence of low latency, low loss and scalable throughput (L4S) traffic and non-L4S traffic in a 5G wireless system is optimized by performing radio resource management at the DU to reduce a scheduling priority metric of a logical channel for the L4S traffic relative to a scheduling priority metric of a logical channel for the non-L4S traffic.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The above-described and other features and advantages of the present disclosure will be appreciated and understood by those skilled in the art from the following detailed description, drawings, and appended claims.

DESCRIPTION OF THE DRAWINGS

FIG. 15 illustrates the details of DL Data Delivery Status (DDDS) sent from the corresponding node (DU in this example) to the node hosting NR PDCP (CU-UP in this example) for each DRB.

DETAILED DESCRIPTION

Figure 17:
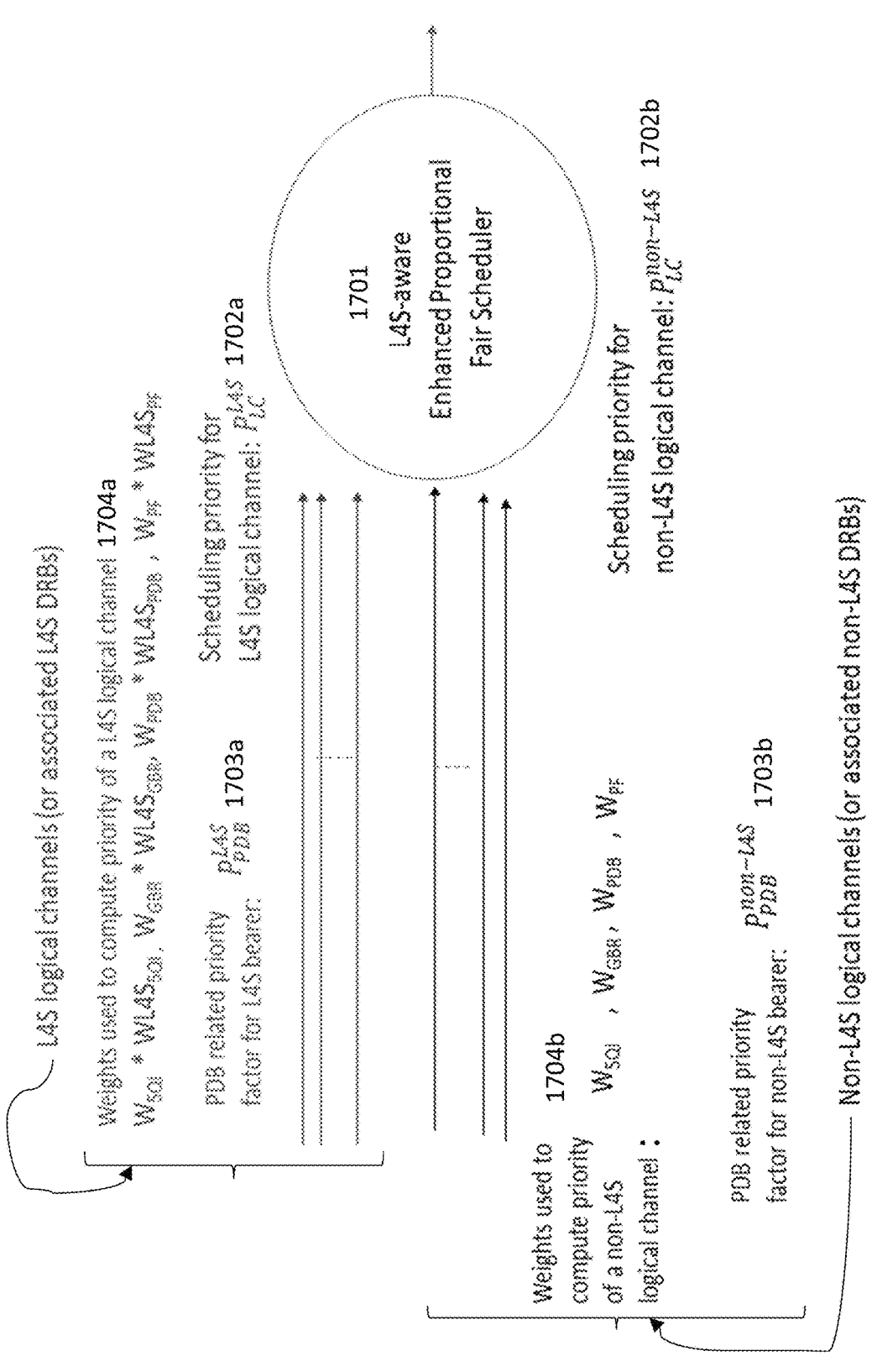
FIG. 17 illustrates an L4S-aware Enhanced Proportional Fair (EPF) scheduler to aid radio resource management.

In the case a network operator's policy is to reduce latency for L4S packets in the 5G base station system, enhanced radio resource management and CU-DU flow control methods can be provided to support the network operator's policy. According to a first example method, enhanced radio resource management for L4S and non-L4S traffic in 5G (e.g., O-RAN) systems is provided. FIG. 17 generally summarizes how an L4S-aware enhanced Proportional Fair Scheduler 1701 determines scheduling priorities 1702a and 1702b for L4S logical channel and non-L4S logical channel, respectively, e.g., based on respective specified PDB-related priority factors (e.g., 1703a for L4S bearer and 1703b for non-L4S bearer) and specified respective weights used to compute priority of L4S and non-L4S logical channels (e.g., weights referenced by 1704a for computing priority of L4S logical channel, and weights referenced by 1704b for computing priority of non-L4S logical channel).

As discussed earlier, some logical channels and associated DRBs in a 5G cell can be carrying L4S traffic (i.e., packets marked with L4S), while some logical channels can be carrying non-L4S traffic. For a non-L4S logical channel of a UE, the priority of the logical channel, $$P_{LC}^{non-L4S},$$

is determined as part of the MAC scheduler for that cell (at DU) with one of the methods as previously described above, e.g.:

$$P_{LC}^{non-L4S} = (W_{5QI} * P_{5QI} + W_{PF} * P_{PF}) * \text{maximum} \left(W_{GBR} * P_{GBR}, W_{PDB} * P_{PDB}^{non-L4S}\right)$$

Although the present example case is described in connection with the above-listed specific method, the present example case is equally applicable for other methods previously described above for determining the priority of the logical channel.

For a DRB (and the associated logical channel) carrying L4S traffic, the priority of this LC $$\left(\text{denoted as } P_{LC}^{L4S}\right)$$

is computed as follows:

$$P_{LC}^{L4S} = (WL4S_{5QI} * W_{5QI} * P_{5QI} + WL4S_{PF} * W_{PF} * P_{PF}) * \text{maximum} \left(WL4S_{GBR} * W_{GBR} * P_{GBR}, WL4S_{PDB} * W_{PDB} * P_{PDB}^{L4S}\right).$$

Weights $WL4S_{5QI}$, $WL4S_{GBR}$, $WL4S_{PDB}$ and $WL4S_{PF}$ and an updated priority metric, $$P_{PDB}^{L4S},$$

for L4S DRBs are used to implement different types of policy-based decisions.

For resource management to reduce latency experienced by the packets corresponding to L4S DRBs (and their associated logical channels) at the DU, the following are performed at the DU L2 Scheduler:
1) For non-GBR traffic, we use $WL4S_{GBR}=0$ and $W_{GBR}=0$. This also stays valid for non-GBR delay-sensitive traffic.
2) For L4S and GBR traffic: $WL4S_{GBR}=$greater than or equal to 1. It can be set to greater than "1" to increase the chances of overall scheduling metric, $$P_{LC}^{L4S},$$

for L4S DRBs being influenced by the GBR part, $P_{GBR}$. As the value of this weight, $WL4S_{GBR}$, increases, this applies the network operator's policy of reducing latency for L4S traffic more aggressively in the 5G RAN system.

3) $WL4S_{PF}$=greater than or equal to 1. It can be set to greater than "1" to increase the chances of overall scheduling priority, $$P_{LC}^{L4S},$$

for L4S DRBs being influenced by the proportional fair part, $P_{PF}$.

4) Choose $WL4S_{5QI}$ to be greater than or equal to one, and $WL4S_{PDB}$ to be greater than or equal to one, for 5QI values corresponding to delay-sensitive applications such as conversational voice (with 5QI=1), conversational video (with 5QI=2), real-time gaming (with 5QI=3), live streaming (with 5QI=7), IMS signalling (with 5QI=5), mission-critical push-to-talk (with 5QI=65) and mission critical video plane (with 5QI=67). As the value of the weight $WL4S_{PDB}$ or $WL4S_{5QI}$ increases for a L4S logical channel, it increases the scheduling priority, $$P_{LC}^{L4S},$$

of the corresponding LC, and increases the chances that this L4S LC will get selected for scheduling, thereby helping to further reduce delay for the corresponding L4S packets.

5) Priority metrics for L4S and non-L4S traffic are computed. $P_{PDB}$ is the priority metric corresponding to the packet delay budget at DU.

For non-L4S traffic:

$$P_{PDB}^{non-L4S} = 1$$

if $PDB^{DU} <= QDelay_{RLC}$ and $$P_{PDB}^{non-L4S} = 1 / (PDB^{DU} - QDelay_{RLC})$$

if $PDB^{DU} > QDelay_{RLC}$, where both $PDB^{DU}$ (Packet Delay Budget at DU for the corresponding LC) and RLC Queuing delay, $QDelay_{RLC}$, are measured in terms of slots. $QDelay_{RLC}=(t-T_{RLC})$, which is the delay of the oldest RLC packet in the QoS flow that has not been scheduled yet, is calculated as the difference in time between the SDU insertion in RLC queue to current time, where t:=current time instant, and $T_{RLC}$:=time instant when oldest SDU was inserted in the RLC queue.

For L4S DRB, $$P_{PDB}^{L4S}$$

for a DRB carrying L4S traffic is computed as follows:

$$P_{PDB}^{L4S} = 1$$

if $PDB^{DU} <= QDelay_{RLC}$ and $$P_{PDB}^{L4S} = \max[n / PDB^{DU} - QDelay_{RLC}),$$

1], if $PDB^{DU} > QDelay_{RLC}$, where both $PDB^{DU}$ (Packet Delay Budget at DU) and RLC Queuing delay, $QDelay_{RLC}$, are measured in terms of slots. $QDelay_{RLC}=(t-T_{RLC})$ is same as defined above, but factor "n" is new. "n" is the number of packets which have been in the RLC queue for a time interval equal to or greater than $\beta * PDB^{DU}$ and less than $PDB^{DU}$. For each packet k which is counted towards "n", we have, $\beta * PDB^{DU} \leq QDelay^k < PDB^{DU}$. $QDelay^k$ is the waiting time of packet k in the RLC queue and $\beta$ is between 0 and 1. For example, if $\beta=0.75$, we will count those RLC packets in the parameter "n" which have waited in the RLC queue for at least $0.75 * PDB^{DU}$ and less than $PDB^{DU}$. We also upper bound "n" by a threshold (i.e., $n \leq n_{threshold}$).

With weights ($WL4S_{5QI}$, $WL4S_{PDB}$ and $WL4S_{GBR}$) chosen as above, and priority factor $$\left( P_{PDB}^{L4S} \right)$$

computed as above, it helps to improve the scheduling priority metric of the LC carrying L4S traffic, $$P_{LC}^{L4S},$$

as per the policy defined by the network operator. DU L2 scheduler considers scheduling priorities for L4S and non-L4S logical channels and allocates radio resources accordingly, thereby helping to reduce latency for L4S traffic.

Figure 1:
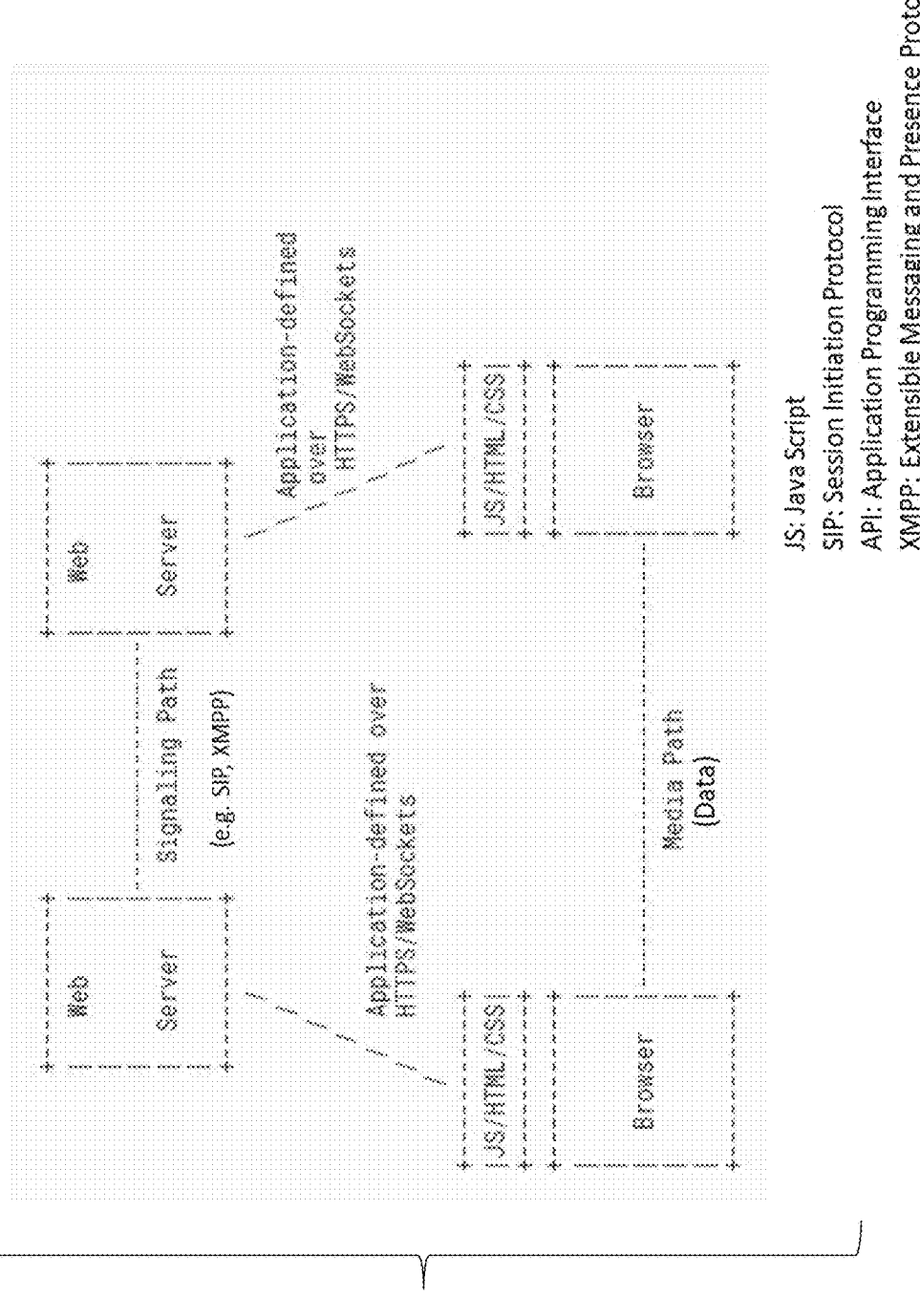
FIG. 1 is a block diagram of multi-domain webRTC system.
Figure 2:
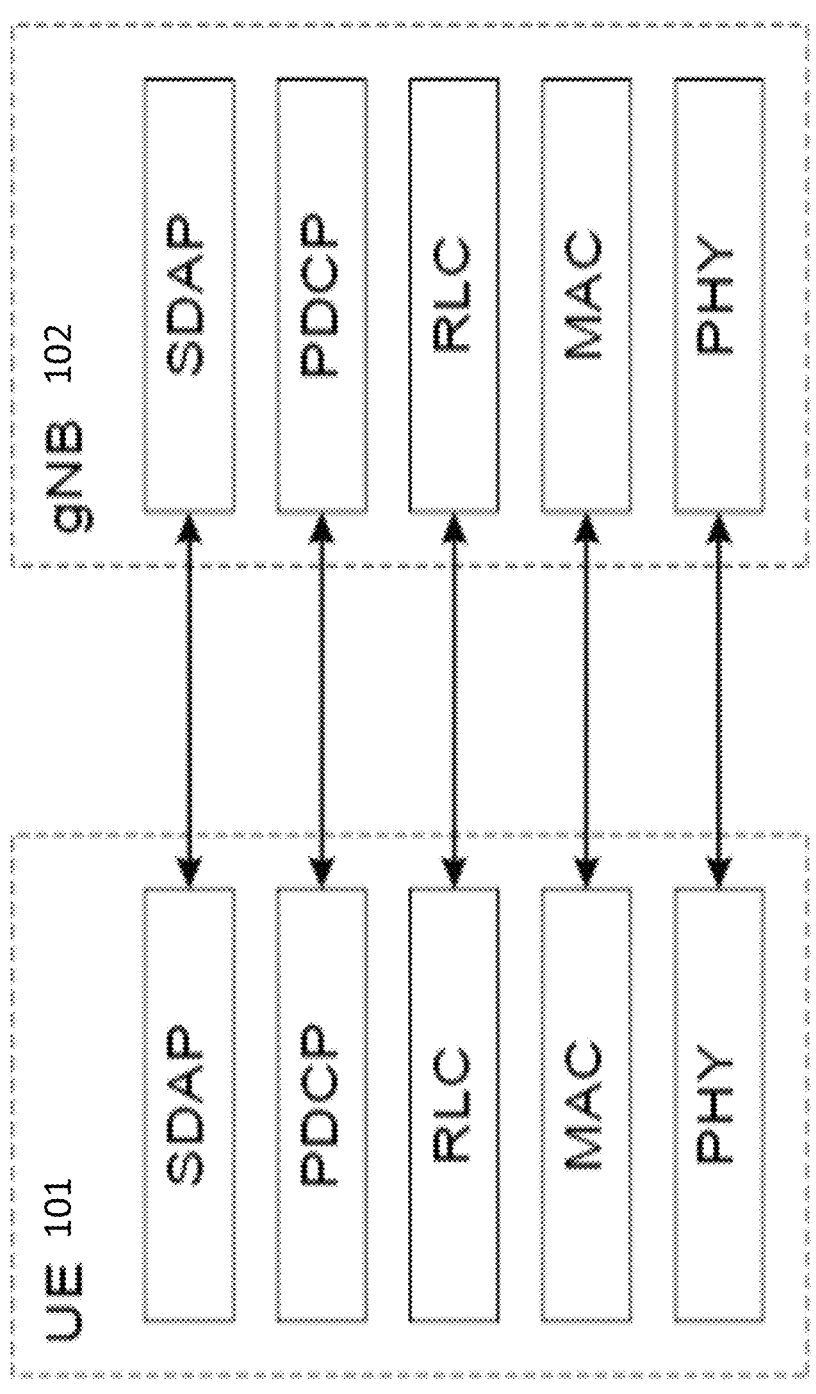
FIG. 2 is a block diagram illustrating the user plane stack of 5G NR.
Figure 3:
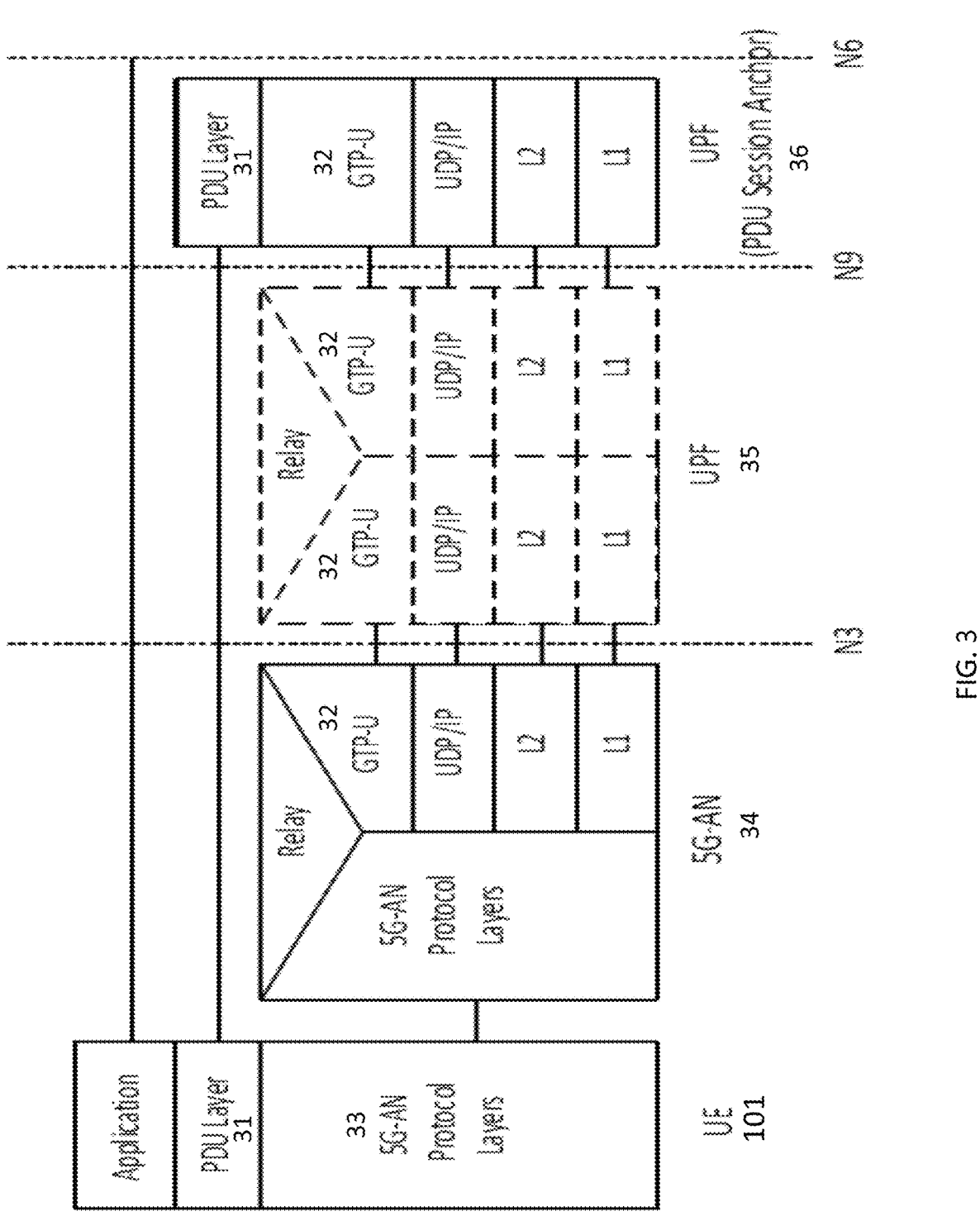
FIG. 3 is a block diagram illustrating the user plane protocol stacks for a PDU session of 5G NR.
Figure 4:
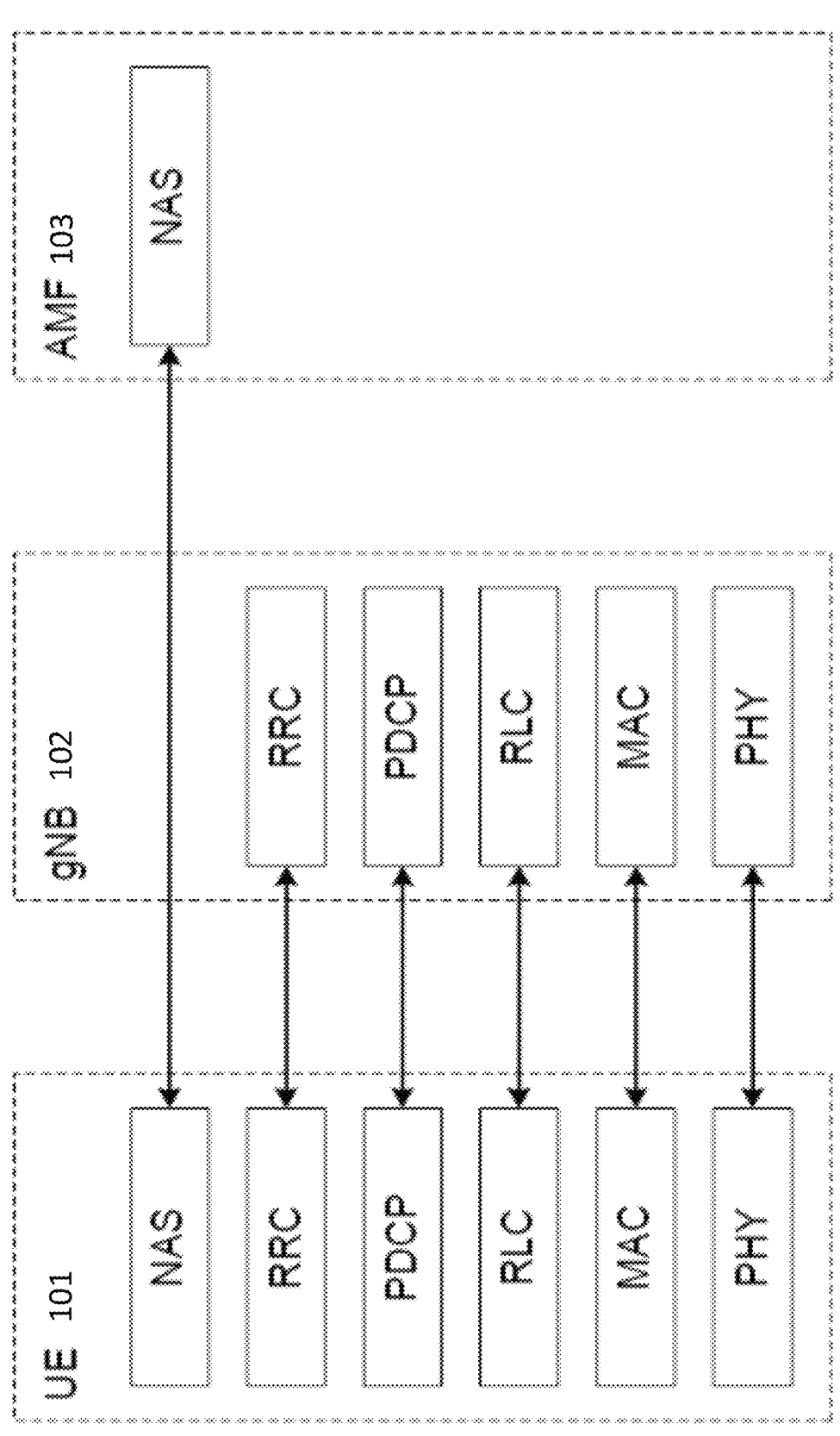
FIG. 4 is a block diagram illustrating the control plane stack of 5G NR.
Figure 5:
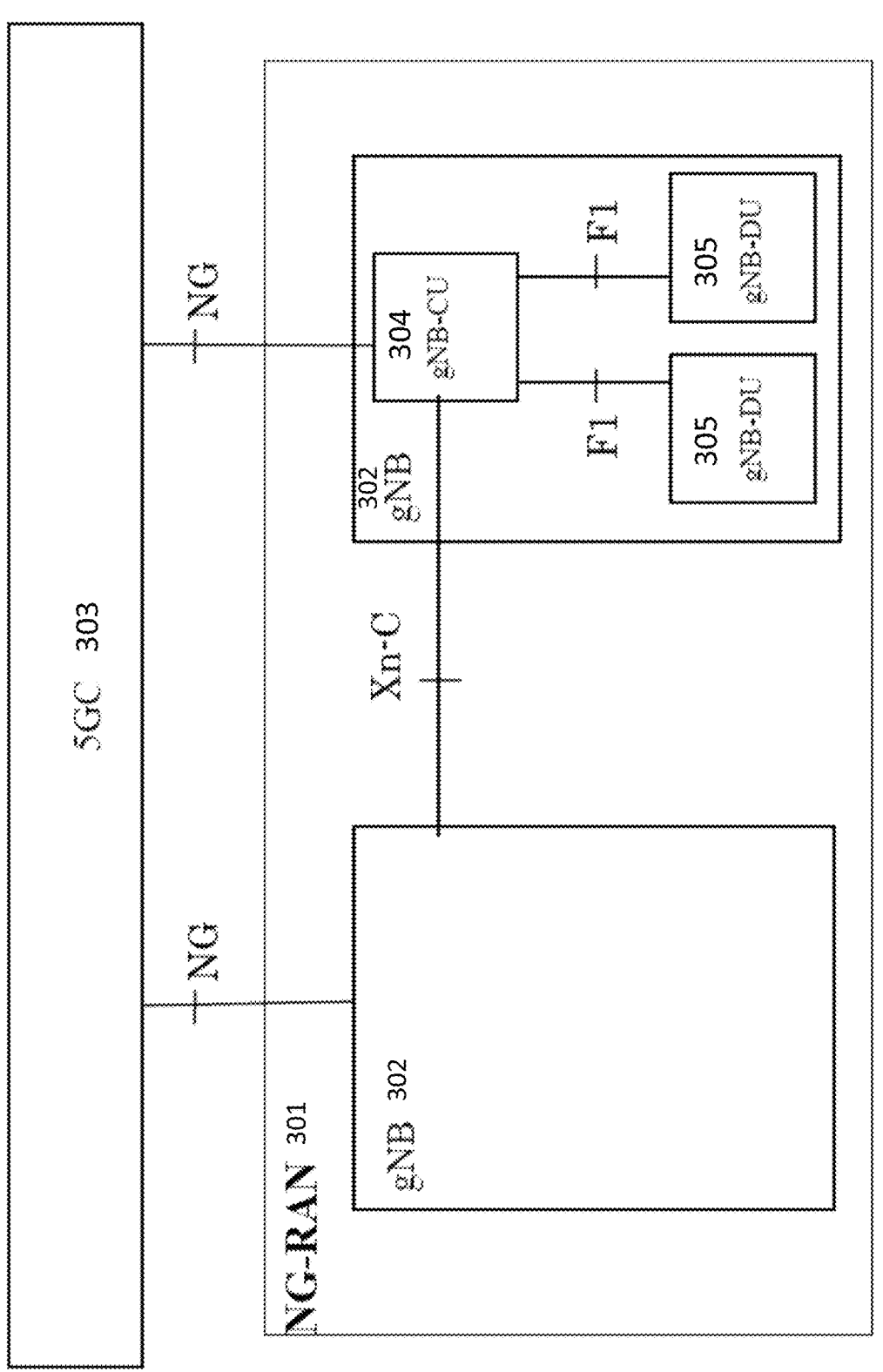
FIG. 5 is a block diagram illustrating NG-RAN architecture.
Figure 6:
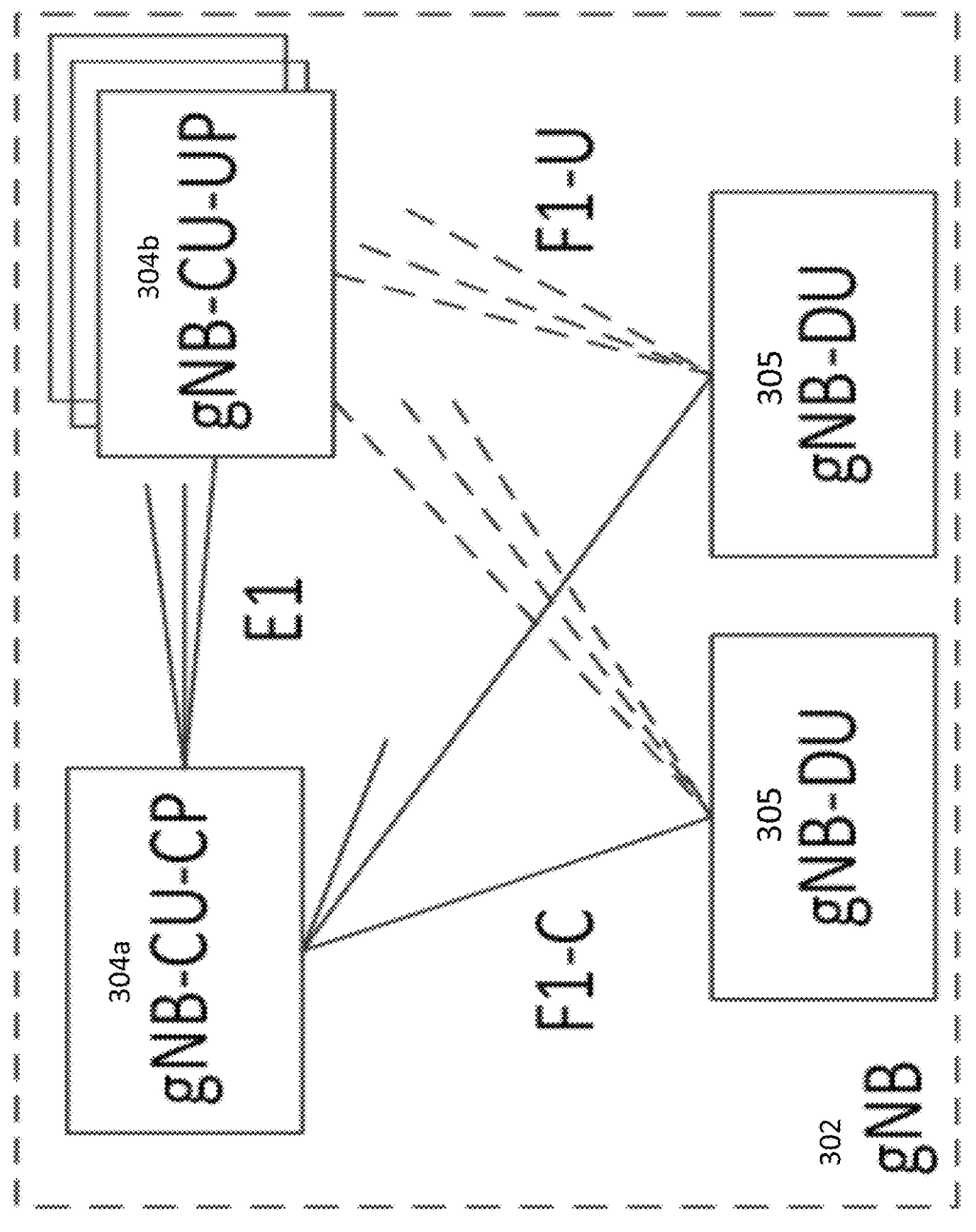
FIG. 6 is a block diagram illustrating separation of CU-CP and CU-UP in NG-RAN architecture.
Figure 7:
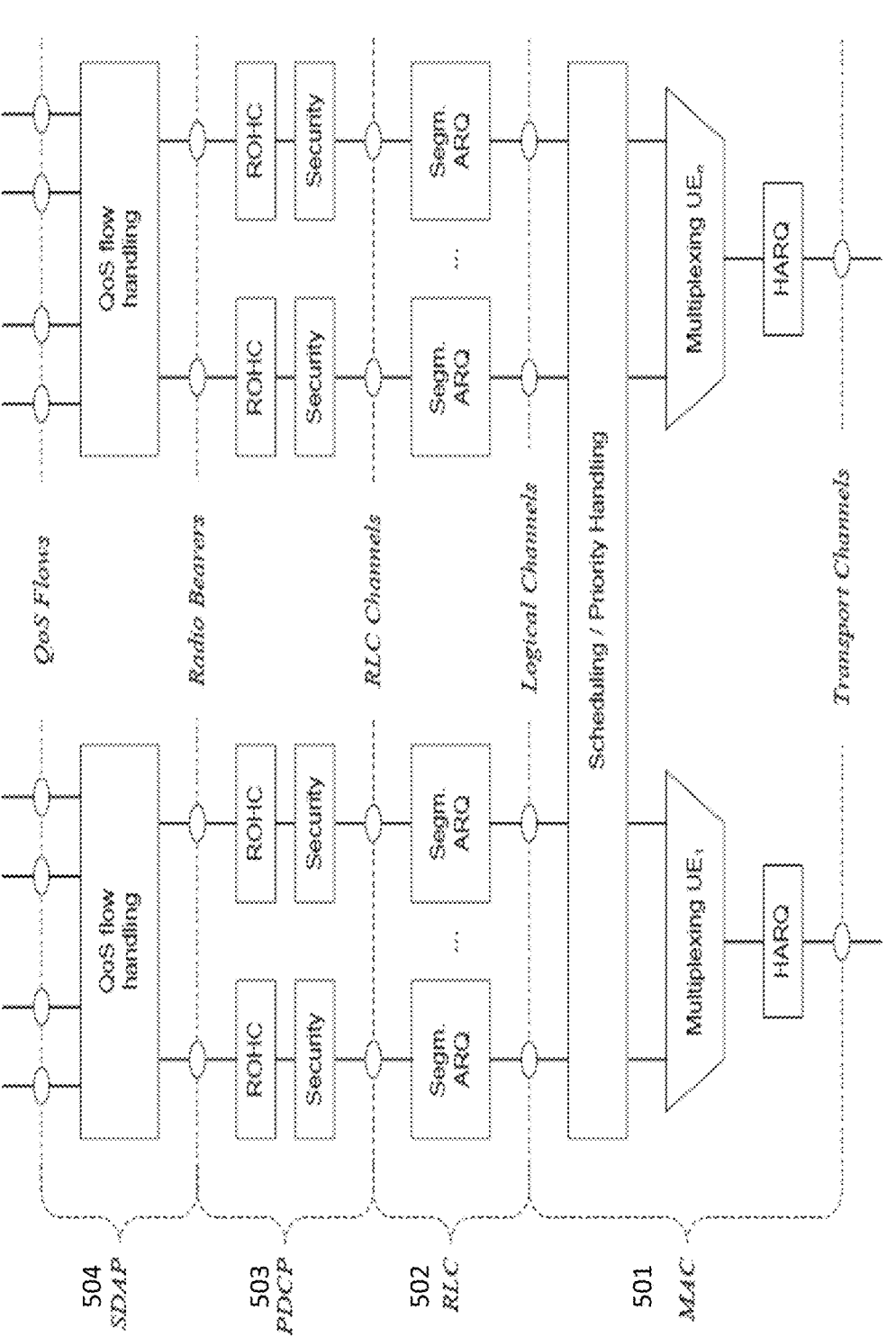
FIG. 7 is a block diagram illustrating DL L2 structure.
Figure 8:
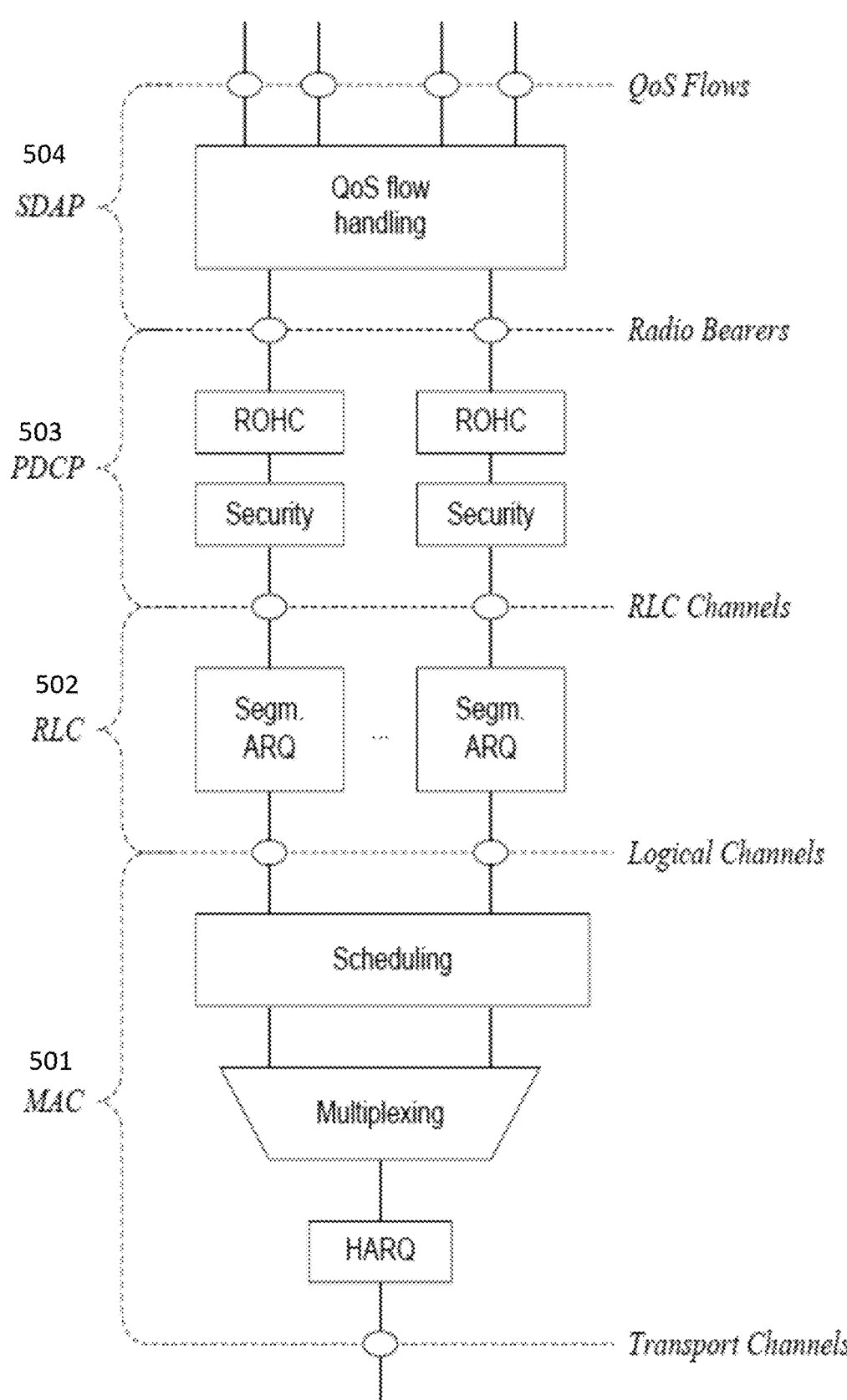
FIG. 8 is a block diagram illustrating UL L2 structure.
Figure 9:
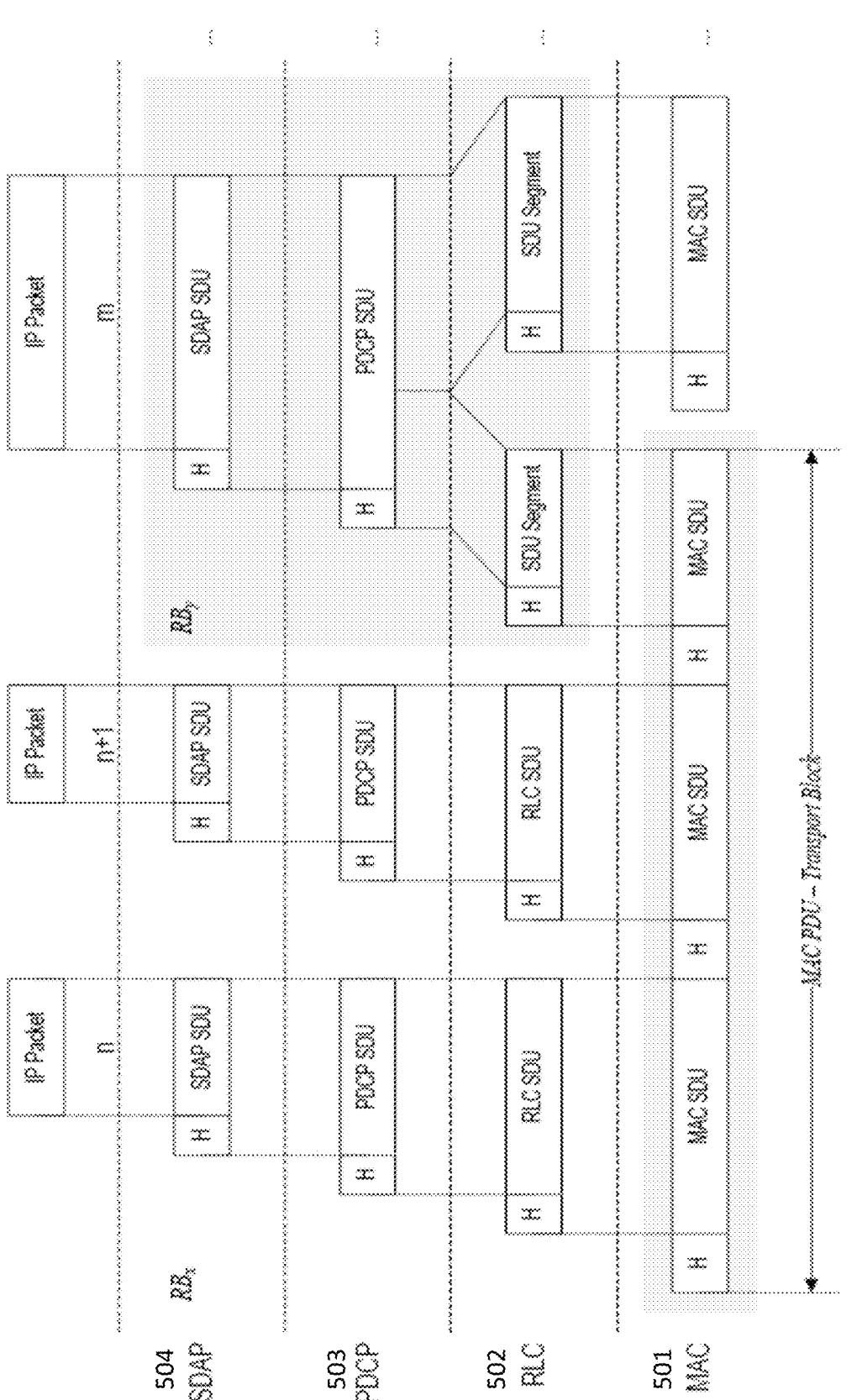
FIG. 9 is a block diagram illustrating L2 data flow example.
Figure 10:
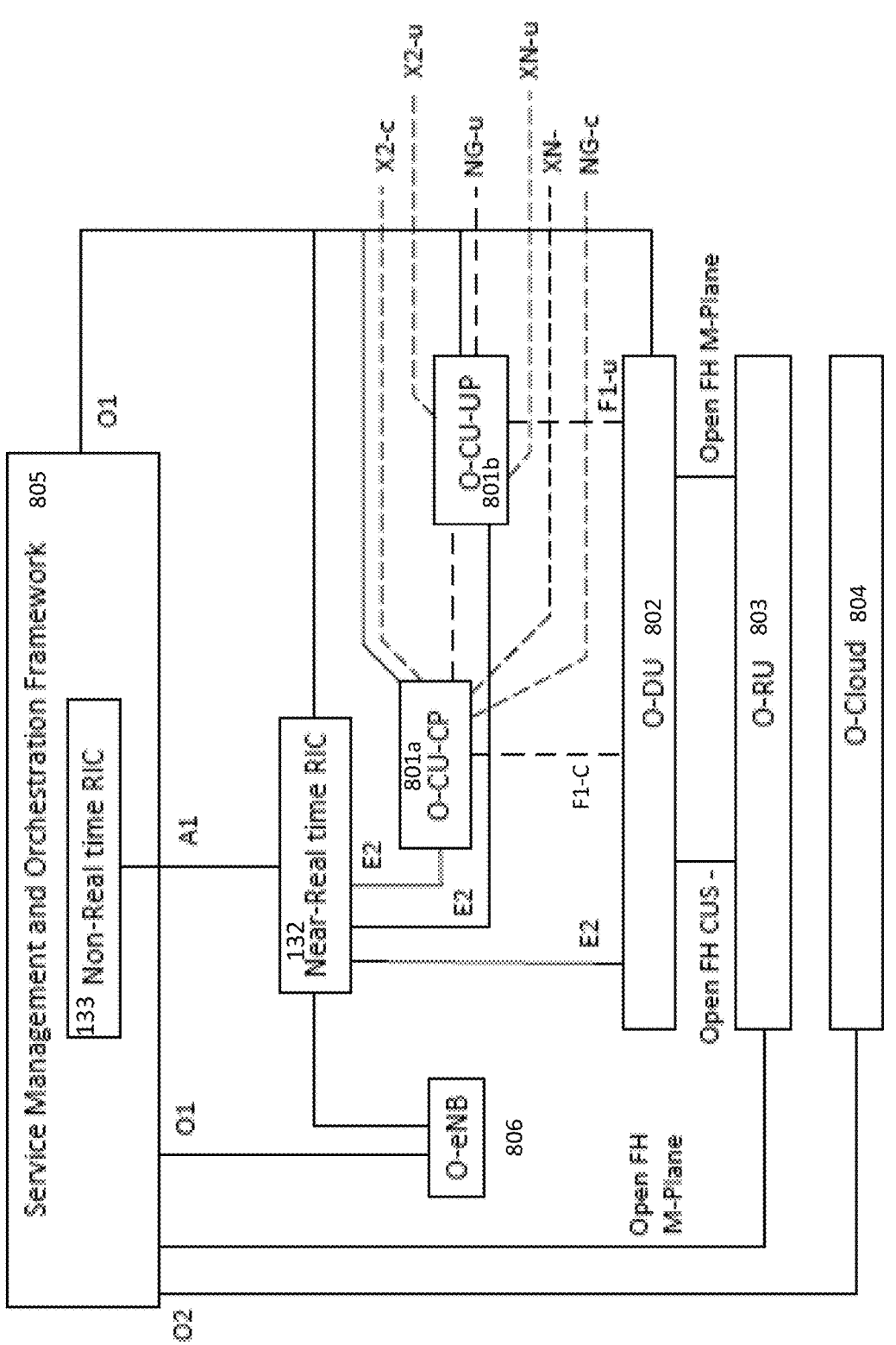
FIG. 10 illustrates an overview of O-RAN architecture.
Figure 11:
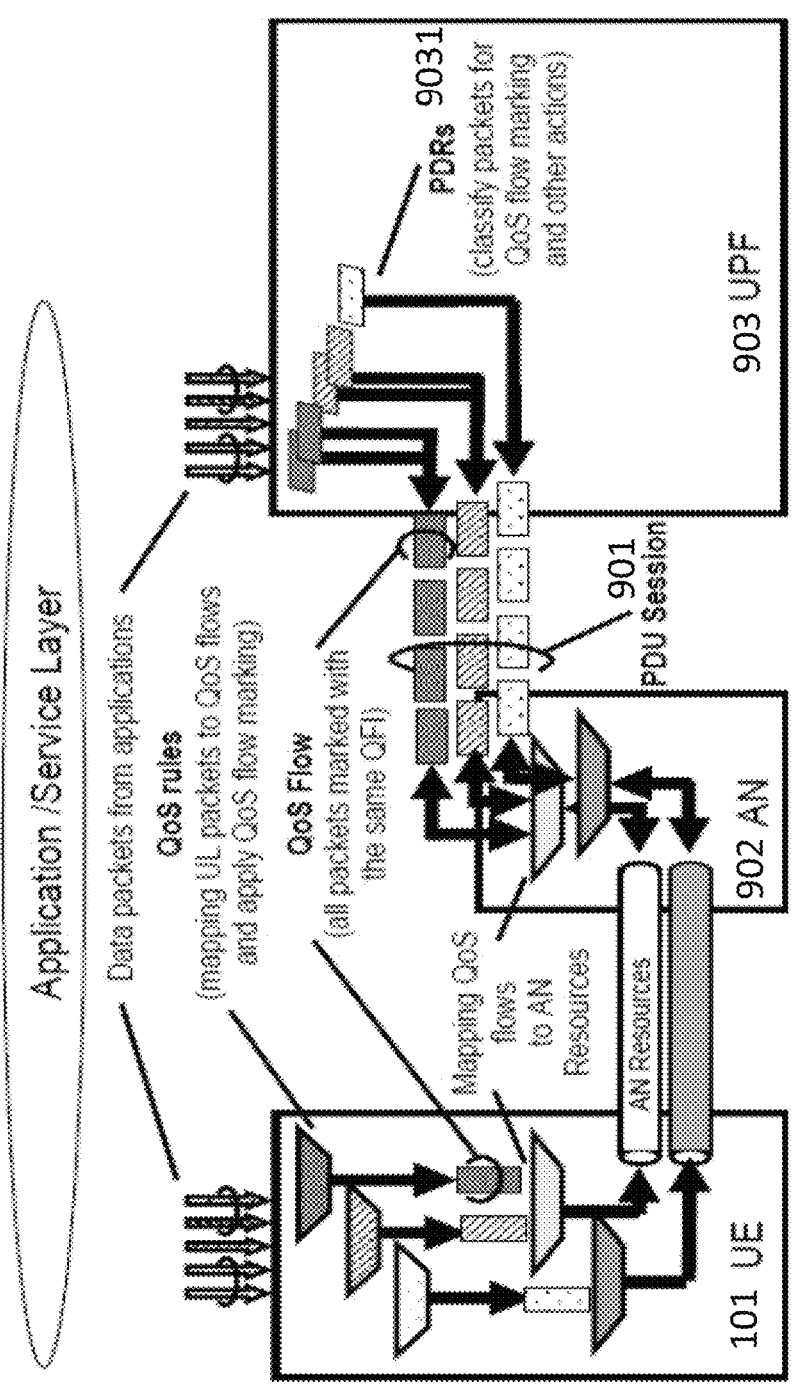
FIG. 11 illustrates an example PDU session consisting of multiple DRBs.
Figure 12:
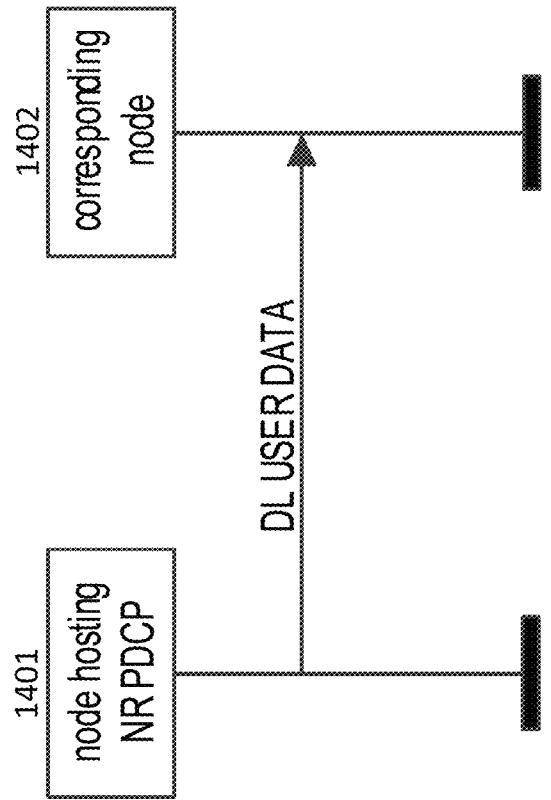
FIG. 12 illustrates DL user data (i.e., PDCP PDUs) from the node hosting NR PDCP (CU-UP in this example) to RLC SDU queues at the corresponding node (DU in this example).
Figure 13:
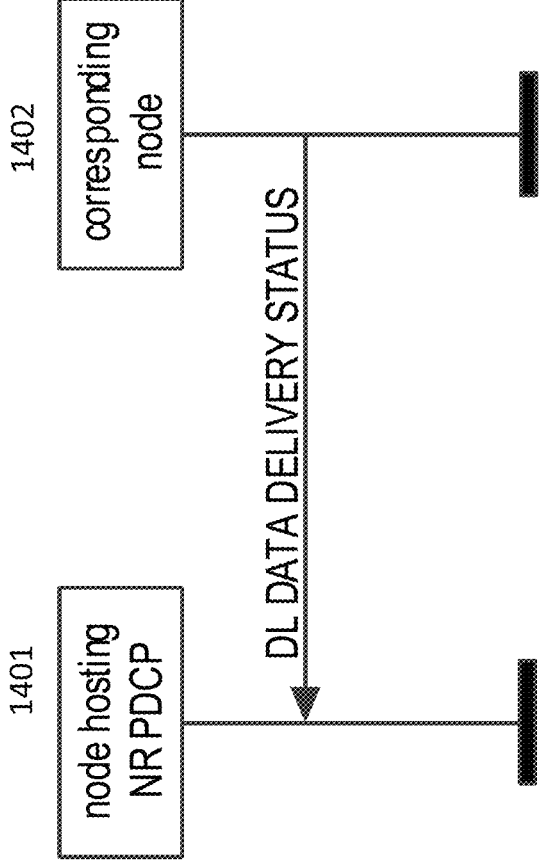
FIG. 13 illustrates DL Data Delivery Status (DDDS) PDU (flow control feedback) being sent from the corresponding node (DU in this example) to the node hosting NR PDCP (CU-UP in this example).
Figure 14:
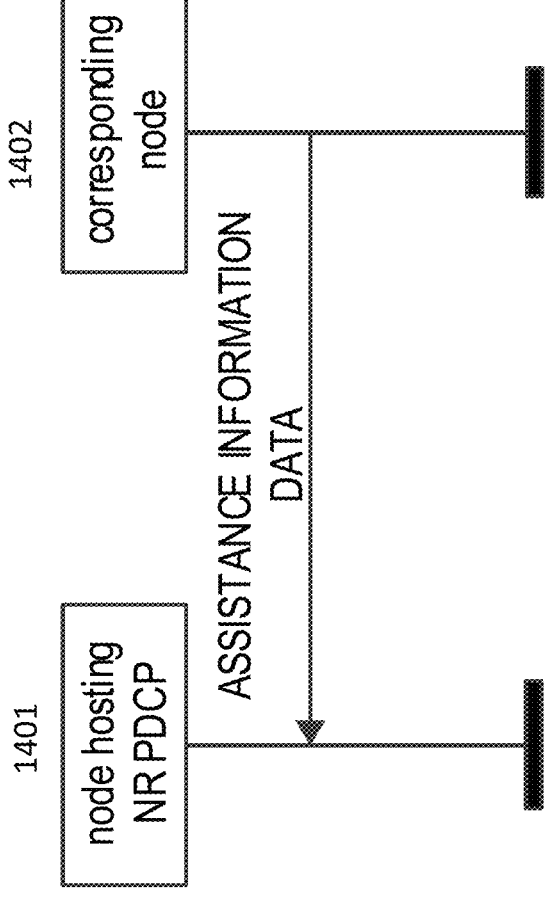
FIG. 14 illustrates transfer of (Radio) Assistance Information from the corresponding node (DU in this example) to the node hosting NR PDCP (CU-UP in this example).
Figure 16:
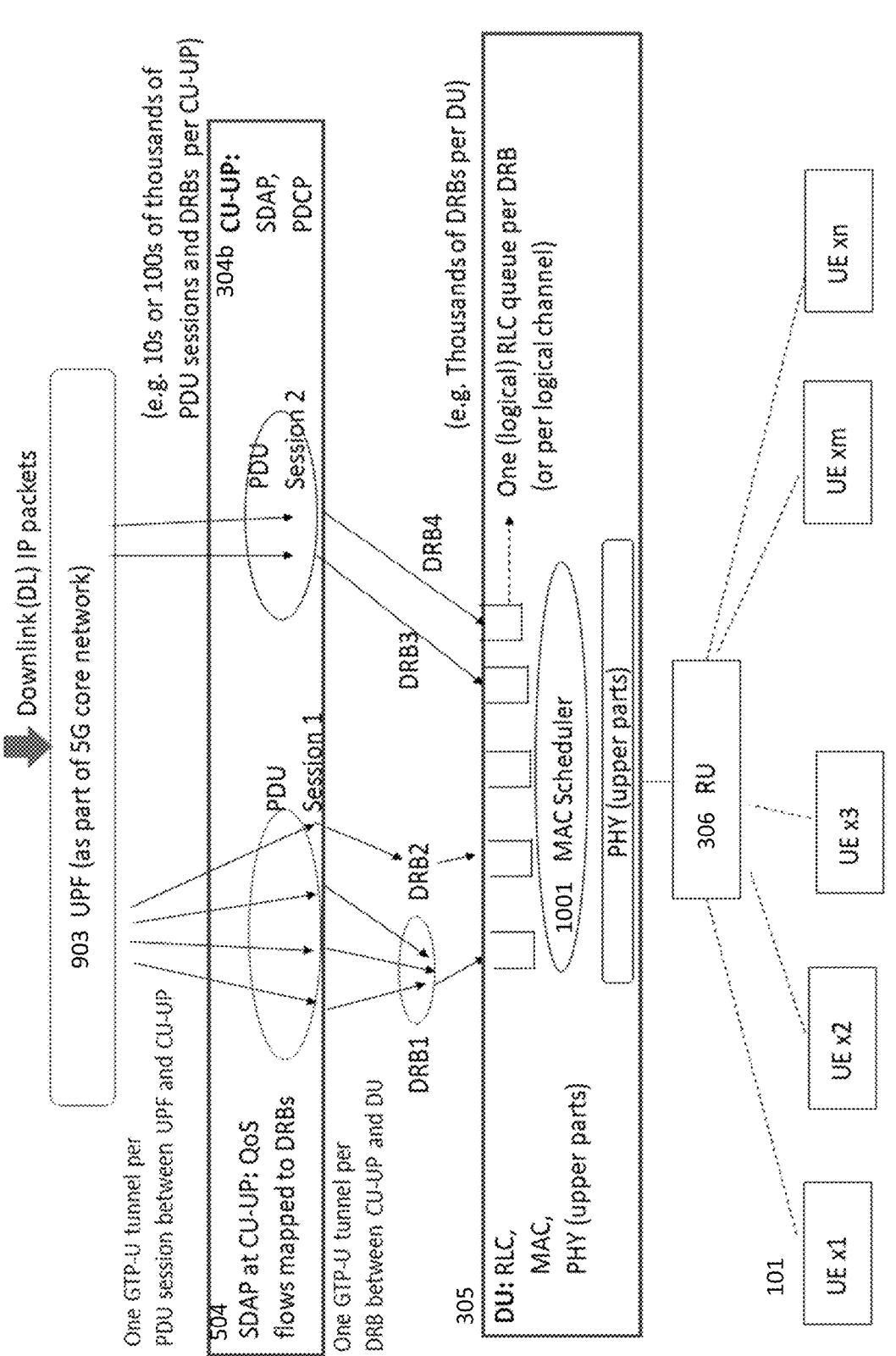
FIG. 16 is a block diagram illustrating RRM with a MAC Scheduler.

According to an example method, CU-DU flow control optimization is provided for improving latency for L4S traffic. CU-DU flow control mechanism is specified in 3GPP TS 38.425, and has been previously summarized above. CU-UP sends data in downlink direction towards DU for a DRB (as shown in FIG. 12), and the DU provides feedback as part of DDDS (DL Data Delivery Status) message as shown in FIG. 13 and FIG. 15. For non-L4S DRBs, DDDS is sent from DU to CU-UP as previously described above. In this example method, the signal flow for which is illustrated in FIG. 18 (for DRBs mapped to RLC UM) and FIG. 19 (for DRBs mapped to RLC UM), performance of L4S applications is improved in the 5G base station system by optimizing CU-DU flow control for a mix of L4S and non-L4S applications.

Figure 18:
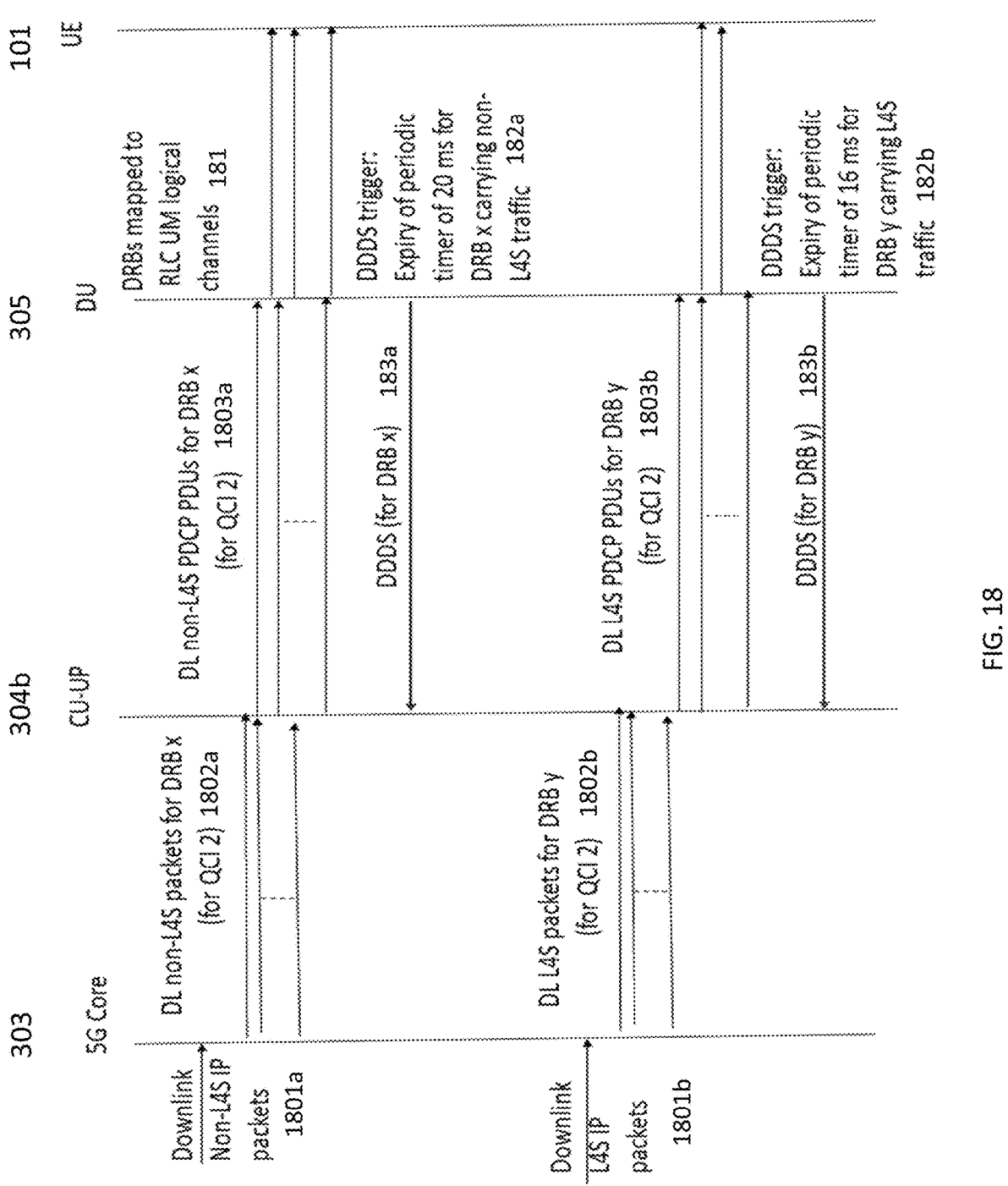
FIG. 18 illustrates a trigger for sending DDDS from DU to CU-UP for DRBs which are mapped to RLC UM and carry L4S or non-L4S traffic.

For non-L4S and L4S DRBs that are mapped to RLC UM (as illustrated in FIG. 18 and generally referenced by 181), the following are performed:

1) For RLC UM (carrying non-L4S traffic), a periodic timer expiry (e.g., 182a for non-L4S DRB traffic) is used as the trigger for sending DDDS from DU 305 to CU-UP 304b.

2) For L4S DRBs, DDDS 183b is sent from DU 305 to CU-UP 304b as follows for DRBs which are mapped to RLC UM: For RLC UM (carrying L4S traffic), we use periodic timer (e.g., 182b for L4S DRB traffic) as trigger for sending DDDS 183b from DU 305 to CU-UP 304b, but we set this timer to a lower value than the corresponding timer (as trigger for sending DDDS 183a) for non-L4S DRBs (which are mapped to RLC UM). For example, if the timer value used for 5QI 2 (conversational video) is 20 ms for non-L4S DRB x (e.g., as referenced by 182a in FIG. 18), we set this timer for L4S DRB y to a value lower than 20 ms (such as 16 ms, as referenced by 182b in FIG. 18). This increases the chances of getting L4S packets from CU-UP 304b to DU 305 earlier than the corresponding packets for the non-L4S DRBs, which in turn increases the chances of the L4S packets reaching UE 101 sooner than the non-L4S packets, thereby helping to reduce the latencies experienced by L4S packets in the 5G base station system. For the sake of completeness, FIG. 18 additionally illustrates the signal flow for DL non-L4S IP packets 1801a and DL L4S IP packets 1801b. For DL non-L4S IP packets 1801a, the following signal flow is illustrated: i) DL non-L4S packets for DRB x 1802a (e.g., for QCI 2) sent from 5G core 303 to CU-UP 304b; and ii) DL non-L4S PDCP PDUs for DRB x 1803a (e.g., for QCI 2) sent from CU-UP 304b to DU 305. For DL L4S IP packets 1801b, the following signal flow is illustrated: i) DL L4S packets for DRB y 1802b (e.g., for QCI 2) sent from 5G core 303 to CU-UP 304b; and ii) DL L4S PDCP PDUs for DRB y 1803b (e.g., for QCI 2) sent from CU-UP 304b to DU 305.

Figure 19:
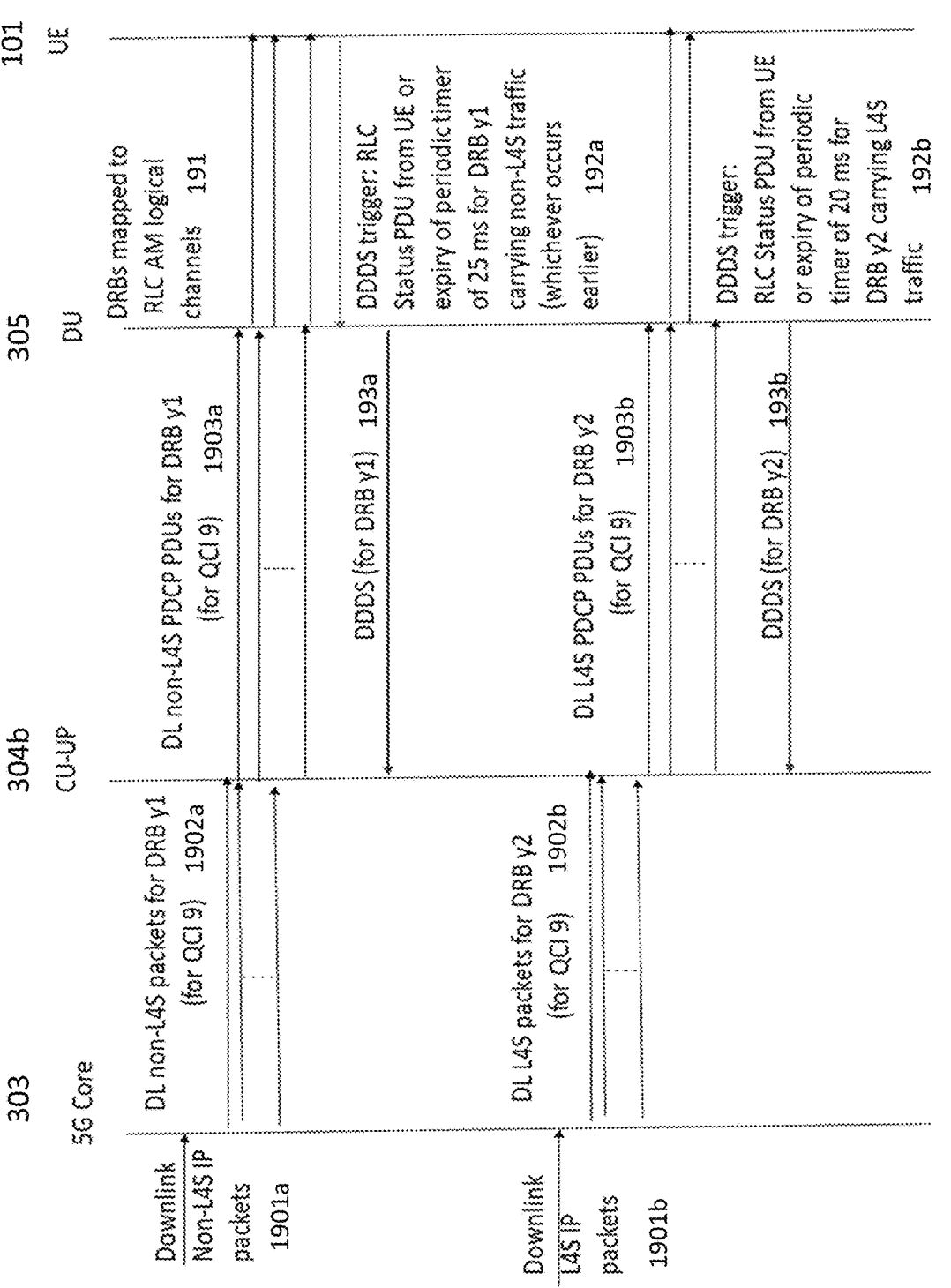
FIG. 19 illustrates a trigger for sending DDDS from DU to CU-UP for DRBs which are mapped to RLC AM and carry L4S or non-L4S traffic.

For non-L4S and L4S DRBs that are mapped to RLC AM (as illustrated in FIG. 19 and generally referenced by 191), the following are performed:

1) For RLC AM (carrying non-L4S traffic), DU 305 triggers DDDS message transmission (to CU-UP 304b) whenever the corresponding periodic timer expires or RLC status PDU is received at the DU 305 (from UE 101) for this DRB, whichever happens first (as referenced by 192a in FIG. 19).

2) For RLC AM (carrying L4S traffic), sending of DDDS 193b is triggered on receipt of RLC Status PDU at DU 305 (from UE 101), or whenever a corresponding periodic timer expires for this DRB, whichever happens first (as referenced by 192b in FIG. 19). However, this timer is set to a lower value than the corresponding timer for non-L4S DRBs (which are mapped to RLC AM). For example, if the timer value used for 5QI 9 (buffered video streaming) is 25 ms for non-L4S DRB y1 (as referenced by 192a in FIG. 19), we set this timer for L4S DRB y2 to be 20 ms (as referenced by 192b in FIG. 19). This increases the chances of getting L4S packets from CU-UP 304b to DU 305 earlier than the corresponding packets for the non-L4S DRBs, which in turn increases the chances of the L4S packets reaching UE 101 sooner than the non-L4S packets, thereby helping to reduce the latencies experienced by L4S packets in the 5G base station system. For the sake of completeness, FIG. 19 additionally illustrates the signal flow for DL non-L4S IP packets 1901a and DL L4S IP packets 1901b. For DL non-L4S IP packets 1901a, the following signal flow is illustrated: i) DL non-L4S packets for DRB y1 1902a (e.g., for QCI 9) sent from 5G core 303 to CU-UP 304b; and ii) DL non-L4S PDCP PDUs for DRB y1 1903a (e.g., for QCI 9) sent from CU-UP 304b to DU 305. For DL L4S IP packets 1901b, the following signal flow is illustrated: i) DL L4S packets for DRB y2 1902b (e.g., for QCI 9) sent from 5G core 303 to CU-UP 304b; and ii) DL L4S PDCP PDUs for DRB y2 1903b (e.g., for QCI 9) sent from CU-UP 304b to DU 305.

In the following sections, example methods for facilitating fair coexistence of L4S and non-L4S traffic in the 5G base station system are presented. According to an example embodiment, a base station (e.g., 5G gNodeB) analyzes various parameters in the system for L4S DRBs and sends a quick feedback to the source of L4S traffic if the base station finds that L4S packets may experience congestion in the gNodeB (or in the associated components, CU, DU, midhaul, or queuing at the DU due to air-interface related dynamics). L4S traffic source can utilize this feedback and adapt using its scalable congestion control. However, for non-L4S traffic, the network doesn't support sending a quick feedback to the source of the non-L4S traffic. Feedback is sent from the UE (e.g., using TCP Acks) via some of the currently deployed mechanisms (e.g., TCP Reno), and it takes longer for non-L4S traffic source to get this feedback in comparison to L4S traffic sources. In addition, non-L4S traffic sources do not support scalable congestion control mechanisms, in contrast to L4S traffic sources. For these reasons, L4S traffic achieves better performance in the network compared to non-L4S traffic. In the case a network operator desires to provide fair treatment to non-L4S traffic as it traverses through CU and DU in the 5G base station system, the following enhanced radio resource management and CU-DU flow control methods can be implemented.

According to an example method for radio resource management at the DU for fair coexistence of L4S and non-L4S traffic, the scheduling priority of each non-L4S logical channel is computed as follows:

$$P_{LC}^{non-L4S} =$$
$$(W_{5QI} * P_{5QI} + W_{PF} * P_{PF}) * \text{maximum} \left( W_{GBR} * P_{GBR}, W_{PDB} * P_{PDB}^{non-L4S} \right)$$

For L4S logical channel, scheduling priority is computed as follows:

$$P_{LC}^{L4S} = (WL4S_{5QI} * W_{5QI} * P_{5QI} + WL4S_{PF} * W_{PF} * P_{PF}) *$$
$$\text{maximum} \left( WL4S_{GBR} * W_{GBR} * P_{GBR}, WL4S_{PDB} * W_{PDB} * P_{PDB}^{L4S} \right)$$

As L4S logical channels are getting preferential treatment in the 5G systems (with quick congestion feedback and scalable congestion control) as described above, the following are performed to facilitate fair coexistence of non-L4S and L4S DRBs (and associated LCs) in DU:

1) For non-GBR L4S DRB, $WL4S_{GBR}$=0.
2) For non-GBR non-L4S DRB, $W_{GBR}$=0.
3) For L4S GBR DRB, $WL4S_{GBR}$ is set to be less than or equal to 1. It can be set to less than "1" to decrease the chances of overall scheduling metric, $$P_{LC}^{L4S},$$

for L4S DRBs being influenced by the GBR part, $P_{GBR}$. As the value of this weight, $WL4S_{GBR}$, decreases, this applies the operator policy of providing fair treatment to L4S and non-L4S traffic more aggressively in the 5G RAN system.

4) $WL4S_{PF}$ is set to be greater than or equal to 1. It can be set to greater than "1" to increase the chances of overall scheduling priority, $$P_{LC}^{L4S},$$

23

Queuing delay, QDelay$_{RLC}$, and QDelay$_{RLC,2}$, are measured in terms of slots. QDelay$_{RLC}$=(t–T$_{RLC}$), which is the same as previously defined earlier, is for the oldest SDU that was inserted in the RLC queue. QDelay$_{RLC,2}$=(t–T$_{RLC,2}$), which is the delay of the second oldest RLC packet in the QoS flow that has not been scheduled yet, is calculated as the difference in time between the SDU insertion in RLC queue and the current time, where t:=current time instant, and T$_{RLC,2}$:=time instant when the second oldest SDU was inserted in the RLC queue. As an example, let's assume that the RLC queue has z packet (with z greater than or equal to 2). We compute QDelay$_{RLC}$ for the oldest SDU in the RLC queue, and QDelay$_{RLC,2}$ for the second oldest packet in the RLC queue. If there is only one packet in the RLC queue, we compute the priority metric, $$P_{PDB}^{L4S},$$

for L4S traffic as follows:

$$P_{PDB}^{L4S} = 1$$

if PDB$^{DU}$<=QDelay$_{RLC}$, and $$P_{PDB}^{L4S} = 1/(PDB^{DU} - QDelay_{RLC}),$$

if PDB$^{DU}$>QDelay$_{RLC}$ and if the RLC queue has at least two packets.

The above-described example embodiments help to provide additional resources for non-L4S traffic and help achieve fair coexistence of L4S and non-L4S traffic in the 5G wireless base station system. In general, weights for L4S traffic can be selected at DU, CU or RIC based on the policies provided by a network operator. If these are selected at non-real-time RIC, these can be communicated to DU by enhancing the O1 interface which exists between non-RT-RIC and DU. If these weights are selected at real-time-RIC, these can be communicated to DU by enhancing the E2 interface which exists between near-RT-RIC and DU. If these are selected at CU, these can be communicated to DU by enhancing F1-C interface which exists between CU-CP and DU. In addition, priority factors considering packet delay budget for delay-sensitive applications can be computed for L4S and non-L4S traffic using the various methods presented above to help allocate radio resources to meet different policies of a network operator.

According to an example method, CU-DU flow control is optimized to provide fair coexistence of L4S and non-L4S traffic in the 5G base station system. For non-L4S and L4S DRBs that are mapped to RLC UM, a periodic timer expiry is used as the trigger for sending DDDS from DU to CU-UP. In this example method, the value of this timer for non-L4S DRB is set to be lower than the value used for L4S DRB. For example, if the timer value used for 5QI 2 (conversational video) is 20 ms for L4S DRB, the timer value for non-L4S DRB is set to be 17 ms. This enables DU to send DDDS feedback for non-L4S DRBs more frequently compared to the DDDS feedback for L4S DRBs, thereby helping CU-UP to send downlink packets corresponding to non-L4S DRBs to DU more frequently compared to L4S DRBs, which in turn helps to facilitate fair coexistence of L4S and non-L4S DRBs in the 5G base station system.

For non-L4S and L4S DRBs that are mapped to RLC AM, the following are performed. For RLC AM carrying L4S traffic, DDDS message transmission (from DU to CU-UP) is triggered whenever the corresponding periodic timer expires or RLC status PDU is received at the DU (from UE) for this DRB, whichever happens first. For RLC AM carrying non-L4S traffic, a similar procedure as that for L4S traffic is performed, but a lower value is set for the periodic timer in comparison to the corresponding timer for L4S DRBs. For example, if the timer value used for 5QI 9 (buffered video streaming) is 25 ms for L4S DRB, we set this timer for non-L4S DRB to be 22 ms. This increases the chances of getting non-L4S packets from CU-UP to DU earlier than the corresponding packets for the L4S DRBs, which in turn increases the chances of the non-L4S packets reaching UE sooner than the L4S packets, thereby helping to facilitate fair coexistence for the L4S and non-L4S traffic in the 5G base station system.

While the present disclosure has been described with reference to one or more exemplary embodiments, it will be understood by those skilled in the art that various changes may be made and equivalents may be substituted for elements thereof without departing from the scope of the present disclosure. For example, although the example methods have been described in the context of 5G cellular networks, the example methods are equally applicable for 4G and other similar wireless networks. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

For the sake of completeness, a list of abbreviations used in the present specification is provided below:

5GC: 5G Core Network
5G NR: 5G New Radio
5QI: 5G QoS Identifier
ACK: Acknowledgement
AM: Acknowledged Mode
APN: Access Point Name
ARP: Allocation and Retention Priority
BS: Base Station
CP: Control Plane
CU: Centralized Unit
CU-CP: Centralized Unit-Control Plane
CU-UP: Centralized Unit-User Plane
DL: Downlink
DDDS: DL Data Delivery Status
DNN: Data Network Name
DRB: Data Radio Bearer
DU: Distributed Unit
eNB: evolved NodeB
EPC: Evolved Packet Core
GBR: Guaranteed Bit Rate
gNB: gNodeB
GTP-U: GPRS Tunneling Protocol-User Plane
IP: Internet Protocol
L1: Layer 1
L2: Layer 2
L3: Layer 3
L4S: Low Latency, Low Loss and Scalable Throughput
LC: Logical Channel
MAC: Medium Access Control NACK: Negative Acknowledgement
NAS: Non-Access Stratum
NR-U: New Radio-User Plane
O-RAN: Open Radio Access Network
PDB: Packet Delay Budget
PDCP: Packet Data Convergence Protocol
PDU: Protocol Data Unit
PHY: Physical Layer
QCI: QoS Class Identifier
QFI: QoS Flow Id
QOS: Quality of Service
QFI: QoS Flow Identifier
RAT: Radio Access Technology
RDI: Reflective QoS Flow to DRB Indication
RLC: Radio Link Control
RLC-AM: RLC Acknowledged Mode
RLC-UM: RLC Unacknowledged Mode
RQI: Reflective QoS Indication
RRC: Radio Resource Control
RRM: Radio Resource Management
RTP: Real-Time Transport Protocol
RTCP: Real-Time Transport Control Protocol
RU: Radio Unit
SCTP: Stream Control Transmission Protocol
SDAP: Service Data Adaptation Protocol
TCP: Transmission Control Protocol
TEID: Tunnel Endpoint Identifier
UDP: User Datagram Protocol
UE: User Equipment
UP: User Plane
UL: Uplink
UM: Unacknowledged Mode
UPF: User Plane Function

The invention claimed is:

1. A method for optimizing coexistence of low latency, low loss and scalable throughput (L4S) traffic and non-L4S traffic in a 5G wireless system serving a user equipment (UE), comprising
one of:
a) performing one of i) a flow control between a centralized unit (CU) and a distributed unit (DU), or ii) radio resource management at the DU, to adjust latency experienced by the L4S traffic; or
b) performing one of iii) a flow control between the CU and the DU to facilitate greater frequency of transmission of non-L4S traffic from CU-user plane (CU-UP) to the DU, or iv) radio resource management at the DU, to adjust a scheduling priority metric of a logical channel for the L4S traffic relative to a scheduling priority metric of a logical channel for the non-L4S traffic;
wherein the scheduling priority $P_{LC}^{non-L4S}$ of each non-L4S logical channel is computed using at least the following factors:
$W_{5QI}$, which is the weight of $P_{5QI}$, which is in turn a priority metric corresponding to a quality of service (QoS) class of the respective logical channel;
$W_{GBR}$, which is the weight of $P_{GBR}$, which is in turn a priority metric corresponding to a target bit rate of the respective logical channel;
$W_{PDB}$, which is the weight of $P_{PDB}$, which is in turn a priority metric corresponding to a packet delay budget at the DU for the respective logical channel, and
$W_{PF}$, which is the weight of $P_{PF}$, which is in turn a priority metric corresponding to a proportional fair metric of the UE;

wherein the scheduling priority $P_{LC}^{non-L4S}$ of each non-L4S logical channel is computed as follows:

$$P_{LC}^{non-L4S} = (W_{5QI} * P_{5QI} + W_{PF} * P_{PF}) * \text{maximum}\left(W_{GBR} * P_{GBR}, W_{PDB} * P_{PDB}^{non-L4S}\right);$$

wherein $P_{PDB}^{non-L4S}$ is the priority metric corresponding to a packet delay budget at the DU for the respective non-L4S logical channel.

2. The method of claim 1, wherein the scheduling priority $P_{LC}^{L4S}$ of each L4S logical channel is computed using at least the following factors:
$W_{5QI}$;
$W_{GBR}$;
$W_{PDB}$;
$W_{PF}$;
$WL4S_{5QI}$, which is the weight of $P_{5QI}$ for the respective L4S logical channel;
$WL4S_{GBR}$, which is the weight of $P_{GBR}$ for the respective L4S logical channel;
$WL4S_{PDB}$, which is the weight of $P_{PDB}$ for the respective L4S logical channel; and
$WL4SPF$, which is the weight of $P_{PF}$ for the respective L4S logical channel.

3. The method of claim 2, wherein the scheduling priority $P_{LC}^{L4S}$ of each L4S logical channel is computed as follows:

$$P_{LC}^{L4S} = (WL4S_{5QI} * W_{5QI} * P_{5QI} + WL4S_{PF} * W_{PF} * P_{PF}) * \text{maximum}\left(WL4S_{GBR} * W_{GBR} * P_{GBR}, WL4S_{PDB} * W_{PDB} * P_{PDB}^{L4S}\right);$$

wherein $P_{PDB}^{L4S}$ is the priority metric corresponding to a packet delay budget at the DU for the respective L4S logical channel.

4. The method of claim 3, wherein, to adjust the latency experienced by the L4S traffic, the radio resource management at the DU is performed to adjust the scheduling priority metric of the logical channel for the L4S traffic relative to the scheduling priority metric of the logical channel for the non-L4S traffic.

5. The method of claim 3, wherein at least one of the following is performed at the DU to facilitate fair coexistence of a non-L4S data radio bearer (DRB) and an L4S DRB:
i) for a non-guaranteed bit rate (non-GBR) L4S DRB, $WL4S_{GBR}$ is set to 0;
ii) for a non-GBR, non-L4S DRB, $W_{GBR}$ is set to 0;
iii) for a GBR, L4S DRB, $WL4S_{GBR}$ is set to be less than or equal to 1;
iv) $WL4S_{PF}$ is set to be greater than or equal to 1; and
v) $WL4S_{5QI}$ is set to be less than or equal to 1, and $WL4S_{PDB}$ is set to be less than or equal to 1.

6. The method of claim 3, wherein at least one of the following is performed:
i) for non-L4S traffic, $P_{PDB}^{non-L4S}$ is set to 1 if $PDB^{DU}$ is less than or equal to $QDelay_{RLC}$, and $P_{PDB}^{non-L4S}$ is set to $1/(PDB^{DU} - QDelay_{RLC})$ if $PDB^{DU}$ is greater than $QDelay_{RLC}$, wherein $PDB^{DU}$ is a packet delay budget at the DU for a respective logical channel, and $QDelay_{RLC}$ is radio link control (RLC) queuing delay defined as a delay of the oldest RLC packet in the QoS flow that has not been scheduled yet; and ii) for L4S traffic, $P_{PDB}^{L4S}$ is set to 1 if $PDB^{DU}$ is less than or equal to $QDelay_{RLC}$, and $P_{PDB}^{L4S}=\max[n/(PDB^{DU}-QDelay_{RLC}), 1]$ if $PDB^{DU}$ is greater than $QDelay_{RLC}$, wherein n is the number of packets which have been in the RLC queue for a specified time interval.

7. The method of claim 3, wherein at least one of the following is performed:

i) for non-L4S traffic, $P_{PDB}^{non-L4S}$ is set to 1 if $PDB^{DU}$ is less than or equal to $QDelay_{RLC}$, and $P_{PDB}^{non-L4S}$ is set to $1/(PDB^{DU}-QDelay_{RLC})$ if $PDB^{DU}$ is greater than $QDelay_{RLC}$, wherein $PDB^{DU}$ is a packet delay budget at the DU for a respective logical channel, and $QDelay_{RLC}$ is radio link control (RLC) queuing delay defined as a delay of the oldest RLC packet in the QoS flow that has not been scheduled yet; and ii) for L4S traffic, Pppp is set to 1 if $PDB^{DU}$ is less than or equal to $QDelay_{RLC}$, and $P_{PDB}^{L4S}=1/[(PDB^{DU}-QDelay_{RLC})*(PDB^{DU}-QDelay_{RLC,2})]$ if $PDB^{DU}>QDelay_{RLC}$ and the RLC queue has at least two packets, wherein $QDelay_{RLC,2}$ is the delay of the second oldest RLC packet in the QoS flow that has not been scheduled yet.

8. The method of claim 1, wherein, for non-L4S data radio bearers (DRBs) and L4S DRBs that are mapped to radio link control Unacknowledged Mode (RLC UM), the following are performed:

for non-L4S traffic, expiration of a first periodic timer having a first duration is used as a trigger for sending downlink data delivery status (DDDS) message from the DU to the CU-UP; and for non-L4S traffic, expiration of a second periodic timer having a second duration different from the first duration is used as a trigger for sending downlink data delivery status (DDDS) message from the DU to the CU-UP.

9. The method of claim 8, wherein the first duration is greater than the second duration.

10. The method of claim 8, wherein the second duration is greater than the first duration.

11. The method of claim 1, wherein, for non-L4S data radio bearers (DRBs) and L4S DRBs that are mapped to radio link control Acknowledged Mode (RLC UM), the following are performed:

for non-L4S traffic, sending of downlink data delivery status (DDDS) message from the DU to the CU-UP is triggered at the expiration of a first periodic timer having a first duration or upon receipt of RLC status Protocol Data Unit (PDU), whichever occurs first; and for L4S traffic, sending of DDDS message from the DU to the CU-UP is triggered at the expiration of a second periodic timer having a second duration different from the first duration or upon receipt of RLC status PDU, whichever occurs first.

12. The method of claim 11, wherein the first duration is greater than the second duration.

13. The method of claim 11, wherein the second duration is greater than the first duration.

14. The method of claim 4, wherein at least one of the following is performed at the DU to facilitate fair coexistence of a non-L4S data radio bearer (DRB) and an L4S DRB:

i) for a non-guaranteed bit rate (non-GBR) L4S DRB, $WL4S_{GBR}$ is set to 0;

ii) for a non-GBR, non-L4S DRB, $W_{GBR}$ is set to 0;

iii) for a GBR, L4S DRB, $WL4S_{GBR}$ is set to be less than or equal to 1;

iv) $WL4S_{PF}$ is set to be greater than or equal to 1; and v) $WL4S_{5QI}$ is set to be less than or equal to 1, and $WL4S_{PDB}$ is set to be less than or equal to 1.

\* \* \* \* \*